(12) United States Patent
Sano et al.

(10) Patent No.: US 8,388,870 B2
(45) Date of Patent: Mar. 5, 2013

(54) METAL-NANOPARTICLE-CONTAINING COMPOSITE, DISPERSION LIQUID THEREOF, AND METHODS FOR PRODUCING THE METAL-NANOPARTICLE-CONTAINING COMPOSITE AND THE DISPERSION LIQUID

(75) Inventors: Yoshiyuki Sano, Sakura (JP); Nobuhiro Sekine, Sakura (JP); Ren-Hua Jin, Sakura (JP); Hiroshi Yonehara, Sakura (JP); Masafumi Uota, Sakura (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/502,564

(22) PCT Filed: Sep. 6, 2010

(86) PCT No.: PCT/JP2010/065194
§ 371 (c)(1),
(2), (4) Date: Jul. 24, 2012

(87) PCT Pub. No.: WO2011/048876
PCT Pub. Date: Apr. 28, 2011

(65) Prior Publication Data
US 2012/0280186 A1 Nov. 8, 2012

(30) Foreign Application Priority Data
Oct. 20, 2009 (JP) ................................ 2009-241371

(51) Int. Cl.
*H01B 1/22* (2006.01)
*B22F 9/24* (2006.01)
*B22F 1/02* (2006.01)
(52) U.S. Cl. ........................ 252/512; 252/514
(58) Field of Classification Search ......... 252/512–514; 423/23; 524/910
See application file for complete search history.

(56) References Cited

U.S. PATENT DOCUMENTS

| | | | |
|---|---|---|---|
| 6,054,507 A * | 4/2000 | Funaki et al. ................. 523/210 |
| 7,922,939 B2 * | 4/2011 | Lewis et al. ................... 252/514 |
| 2005/0074551 A1 | 4/2005 | Huang et al. |
| 2008/0145545 A1 * | 6/2008 | Chisholm et al. .......... 427/385.5 |

FOREIGN PATENT DOCUMENTS

| | | |
|---|---|---|
| JP | 2003-103158 A | 4/2003 |
| JP | 2005-281845 A | 10/2005 |
| JP | 2005-534810 A | 11/2005 |
| JP | 2008-072052 A | 3/2008 |
| JP | 2009-127092 A | 6/2009 |

OTHER PUBLICATIONS

International Search Report dated Oct. 19, 2010, issued for PCT/JP2010/065194.

* cited by examiner

*Primary Examiner* — Mark Kopec
(74) *Attorney, Agent, or Firm* — Edwards Wildman Palmer LLP

(57) ABSTRACT

Provided are a composite of nanoparticles of a metal such as gold, silver, a platinum metal, or copper, and a polymer, the composite allowing formation of a metal film having a sufficiently low resistivity in terms of practicality simply by drying at room temperature without requiring any special heating-baking step or any step of removing a protective agent with a solvent; a dispersion liquid of the composite; methods for producing the foregoing; and a plastic substrate formed from the dispersion liquid. The composite comprises a (meth) acrylic-based copolymer having, as side chains, a polyethylene glycol chain and a phosphate residue represented by —OP(O)(OH)2 and having, at at least one end of the molecular chain, —SR (where R represents an alkyl group or the like).

16 Claims, 9 Drawing Sheets

FIG. 3.2
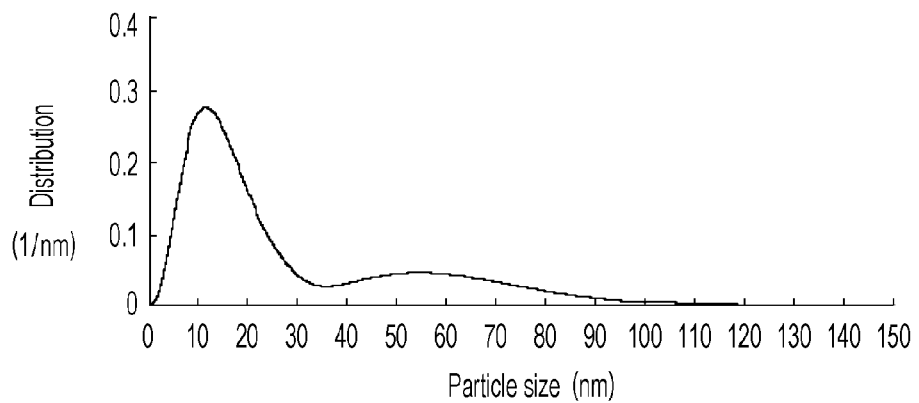
FIG. 3.3
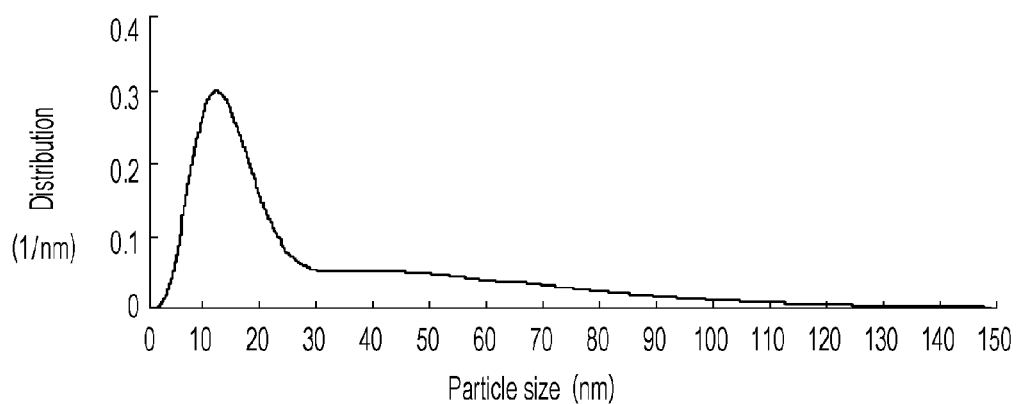
FIG. 3.4
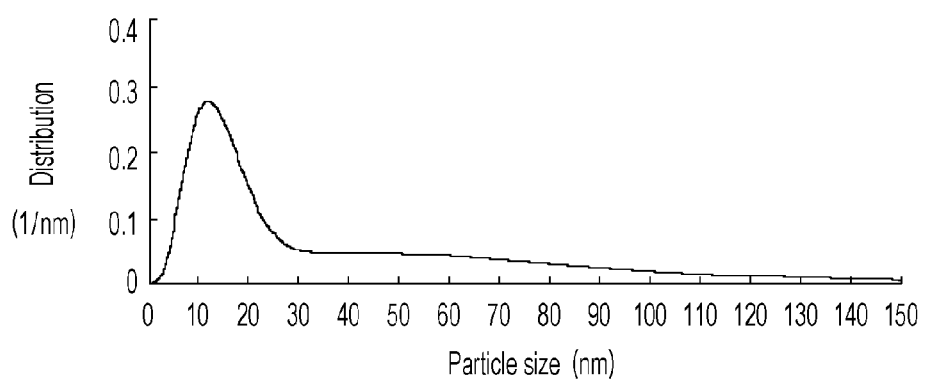

|  |  | As prepared | After 6 h | After 12.5 h |
|---|---|---|---|---|
| Crystallite size | $D_x$ (nm) | 11.2 | 12.0 | 15.2 |
| X-ray wavelength | $\lambda$ (nm) | 0.1542 | 0.1542 | 0.1542 |
| Corrected half width | $\beta$ (rad) | 0.0132 | 0.0123 | 0.0097 |
| Half width | b (deg) | 0.78 | 0.73 | 0.59 |
| Half width of standard material | b' (deg) | 0.2 | 0.2 | 0.2 |
| Peak of diffraction angle | $2\theta$ (deg) | 38.48 | 38.08 | 38.10 |

FIG. 11. 4
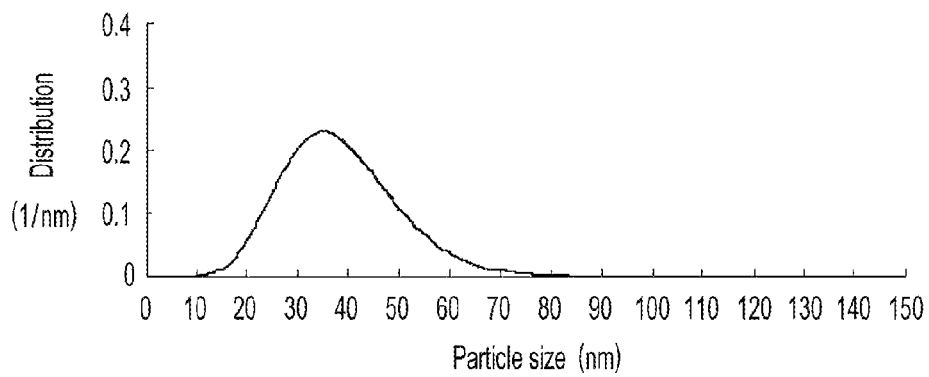
FIG. 12. 1
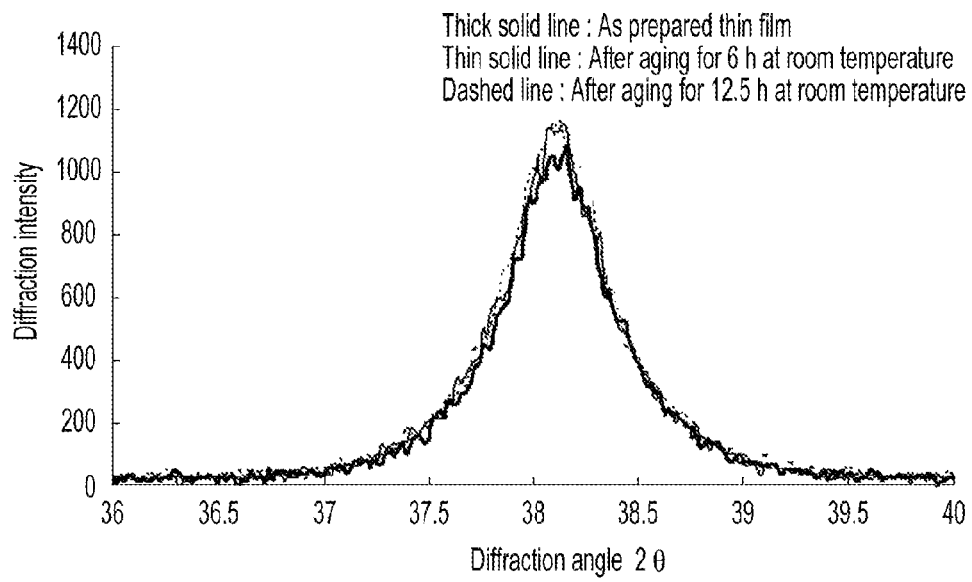
FIG. 12. 2
|  |  | As prepared | After 6 h | After 12.5 h |
|---|---|---|---|---|
| Crystallite size | $D_x$ (nm) | 16.1 | 16.1 | 16.1 |
| X-ray wavelength | $\lambda$ (nm) | 0.1542 | 0.1542 | 0.1542 |
| Corrected half width | $\beta$ (rad) | 0.0091 | 0.0091 | 0.0091 |
| Half width | b (deg) | 0.56 | 0.56 | 0.56 |
| Half width of standard material | b' (deg) | 0.2 | 0.2 | 0.2 |
| Peak of diffraction angle | $2\theta$ (deg) | 38.16 | 38.14 | 38.12 |

US 8,388,870 B2

METAL-NANOPARTICLE-CONTAINING COMPOSITE, DISPERSION LIQUID THEREOF, AND METHODS FOR PRODUCING THE METAL-NANOPARTICLE-CONTAINING COMPOSITE AND THE DISPERSION LIQUID

TECHNICAL FIELD

The present invention relates to a composite of metal nanoparticles and a polymer, the composite being prepared by a liquid-phase reduction method; a dispersion liquid of the composite; and methods for producing the composite and the dispersion liquid. In particular, the present invention relates to a composite of metal nanoparticles and a polymer, the composite allowing formation of a metal film having a volume resistivity on the order of $10^{-5}$ Ωcm, which is sufficiently low in terms of practicality, in which drying of the composite at room temperature (1° C. to 30° C.) without any substantial heating process causes the polymer serving as a protective agent to be detached from the surfaces of the metal nanoparticles so that the metal nanoparticles easily fuse together; a dispersion liquid of the composite; methods for producing the composite and the dispersion liquid; and a plastic substrate produced from the composite and the dispersion liquid.

BACKGROUND ART

In recent years, it has been found that metal fine particles on the nanometer level (hereafter, referred to as metal nanoparticles) may exhibit thermal and magnetic properties different from those of normal metal bulk; and novel reactions and materials utilizing these properties have been intensively developed. For example, although normal gold particles are nonmagnetic, it is known that gold nanoparticles having a size of several nanometers exhibit ferromagnetic spin polarization. In addition, although gold in bulk form is chemically inert, a gold cluster having a size of several nanometers exhibits its properties of a Lewis acid; and, on the basis of these properties, coupling reactions and oxidation catalytic reactions due to activation of oxygen molecules are being intensively studied.

Unlike general metal powder particles on the order of millimeters, metal nanoparticles fuse together at a very low temperature with respect to the melting point of the chemical element. For example, silver has a melting point more than 960° C., whereas silver nanoparticles having a particle size of 100 nm or less fuse together even at a temperature of 200° C. or less. Accordingly, when such nanoparticles are produced in the form of ink or coating material, a conductive coating material that allows formation of electronic circuits by printing even on polymeric films having low heat resistance can be provided. For this reason, nanoparticles are a material that is particularly attracting attention.

To cause the low-temperature fusion phenomenon, metal particles need to be produced such that the particle size is minimized. For this purpose, the vacuum evaporation method and liquid-phase methods in which a metal compound in the form of a solution is reduced in the presence of various colloid protective agents have been developed. The latter methods often need a large amount of a colloid protective agent in accordance with the specific surface of the particles to be generated; however, since organic matter remaining on metal nanoparticles can increase the fusion temperature, the amount of the colloid protective agent used needs to be minimized. However, when the amount of the colloid protective agent is decreased, disadvantages tend to be caused: the resultant metal-nanoparticle dispersion becomes unstable and agglomeration occurs to provide coarse particles or precipitation occurs during storage.

It is known that, for example, in the case of forming a metal coating film from a dispersion liquid of silver nanoparticles, to achieve low-temperature baking at 200° C. or less, the amount of a colloid protective agent remaining on the particles is desirably controlled to be 5 mass % or less; when this amount exceeds, it is difficult to achieve a low resistivity on the order of $10^{-5}$ Ωcm even by baking at 200° C. (for example, refer to Patent Literature 1). Accordingly, selection of a colloid protective agent that can maintain, in a small amount thereof, stable dispersion of metal nanoparticles is important for achieving the low-temperature baking. In spite of such efforts, to achieve a low resistivity on the order of $10^{-5}$ Ωcm, in most cases, heating-baking at 150° C. or more after application is still required.

There is a rare exception that a group of National University Corporation Osaka University and Osaka Foundation for Trade and Industry achieved a volume resistivity on the order of $10^{-5}$ Ωcm in the following manner: a thin film is formed from a tetradecane dispersion of silver nanoparticles covered with dodecylamine; this film is immersed in a polar solvent and, in this solvent, dodecylamine coordinated to the surfaces of the metal nanoparticles is dissociated; and the resultant film is dried at room temperature (for example, refer to Patent Literature 2). However, such a step of immersing a coated member in a polar solvent for several hours in advance to remove a protective agent through dissolution is not suitable for applications to packaging techniques including formation of conductive wiring and conductive electrodes on coated members (substrates). In addition, when the step of immersion in a polar solvent is performed, adhesion between a substrate and metal nanoparticles is not ensured and separation of the metal nanoparticles from the substrate is unavoidable. Thus, the achievement of a low resistivity by means of drying at room temperature only is merely a local phenomenon and lacks practicality.

CITATION LIST

Patent Literature

PTL 1: Japanese Unexamined Patent Application Publication No. 2003-103158
PTL 2: Japanese Unexamined Patent Application Publication No. 2008-072052

SUMMARY OF INVENTION

Technical Problem

An object of the present invention is to provide a composite of nanoparticles of a metal such as gold, silver, a platinum metal, or copper, and a polymer, the composite allowing formation of a metal film having a resistivity sufficiently low in terms of practicality through just drying at room temperature without any special heating-baking step or any step of removing a protective agent with a solvent; a dispersion liquid of the composite; methods for producing the composite and the dispersion liquid; and a plastic substrate formed from the dispersion liquid.

Solution to Problem

When metal nanoparticles are used as a conductive material, a dispersion liquid thereof needs to be prepared. Thus, metal nanoparticles need to be stably dispersed in the dispersion liquid for a long period of time without agglomeration, fusion, or precipitation. In contrast, after a substrate is coated or printed with the metal nanoparticles, the protective agent needs to be detached and the metal nanoparticles need to sufficiently fuse together. To maintain the stability in the dispersion liquid, the surfaces of metal nanoparticles need to be protected with an organic compound. In general, a metal-nanoparticle thin film formed on a substrate by application/printing contains metal nanoparticles covered with a protective agent and hence the metal nanoparticles do not fuse together. The protective agent is most effectively detached by heating. Specifically, the protective agent composed of an organic compound is thermally decomposed or thermally dissociated. The inventors of the present invention performed thorough studies and, as a result, have found that a metal-nanoparticle-containing composite prepared by adding a reducing agent to an aqueous solution of a metal compound in the presence of a protective agent including specific functional groups, can be stably dispersed in a solvent for a long period of time and forms a thin film having a high conductivity through spontaneous fusion of the metal nanoparticles due only to drying of the applied composite at room temperature. Thus, the inventors have accomplished the present invention.

Accordingly, the present invention provides a method for producing a metal-nanoparticle-containing composite and a method for producing a dispersion liquid of the composite, the methods including (I) a step of dissolving, in an aqueous medium, a (meth)acrylic-based polymer (B1) prepared through polymerization of a (meth)acrylate-based macromonomer (x1) having a polyethylene glycol chain (b1) in the presence of a chain transfer agent (x3) having a functional group (b3) represented by —SR (where R represents an alkyl group having 1 to 18 carbons; phenyl group that may optionally have a substituent on a benzene ring; or an alkyl group having 1 to 8 carbons, the alkyl group having at least one functional group selected from the group consisting of a hydroxy group, an alkoxy group having 1 to 18 carbons, an aralkyloxy group having 1 to 18 carbons, a phenyloxy group that may optionally have a substituent on a benzene ring, a carboxy group, a salt of a carboxy group, a monovalent or polyvalent alkylcarbonyloxy group having 1 to 18 carbons, and a monovalent or polyvalent alkoxycarbonyl group having 1 to 18 carbons) and a (meth)acrylic-based polymer (B2) prepared through polymerization of a (meth)acrylate-based monomer (x2) having a phosphate residue (b2) represented by —OP(O)(OH)$_2$ in the presence of a chain transfer agent (x3) having a functional group (b3) represented by —SR (where R has the same definition as above);

(II) a step of adding a metal compound (A) or an aqueous solution of the metal compound (A) to an aqueous solution prepared in (I); and (III) a step of dropping a reducing agent (C), an aqueous solution of the reducing agent (C), or an aqueous solution containing the (meth)acrylic-based polymer (B1) and/or the (meth)acrylic-based polymer (B2) and the reducing agent (C), into a mixed solution prepared in (II).

The present invention further provides a method for producing a metal-nanoparticle-containing composite and a method for producing a dispersion liquid of the composite, the methods including (I') a step of dissolving, in an aqueous medium, a (meth)acrylic-based polymer (B3) prepared through polymerization of a (meth)acrylate-based macromonomer (x1) having a polyethylene glycol chain (b1) and a (meth)acrylate-based monomer (x2) having a phosphate residue (b2) represented by —OP(O)(OH)$_2$ in the presence of a chain transfer agent (x3) having a functional group (b3) represented by —SR (where R has the same definition as above);

(II') a step of adding a metal compound (A) or an aqueous solution of the metal compound (A) to an aqueous solution prepared in (I'); and (III') a step of dropping, into a mixed solution prepared in (II'), a reducing agent (C), an aqueous solution of the reducing agent (C), or an aqueous solution containing the reducing agent (C) and at least one (meth)acrylic-based polymer selected from the group consisting of the (meth)acrylic-based polymer (B1), the (meth)acrylic-based polymer (B2), and the (meth)acrylic-based polymer (B3).

The present invention further provides a metal-nanoparticle-containing composite including metal nanoparticles (A') that have a particle size of 2 to 50 nm and are covered with a (meth)acrylic-based polymer (B), wherein the (meth)acrylic-based polymer (B) includes a (meth)acrylic-based polymer (B1) that has, at at least one end, a functional group (b3) represented by —SR (where R has the same definition as above), and has a polyethylene glycol chain (b1) as a side chain, and a (meth)acrylic-based polymer (B2) that has, at at least one end, a functional group (b3) represented by —SR (where R has the same definition as above) and has, as a side chain, a phosphate residue (b2) represented by —OP(O)(OH)$_2$; a dispersion liquid of a metal-nanoparticle-containing composite, including the above-described metal-nanoparticle-containing composite being dispersed in at least one solvent selected from the group consisting of water and an organic solvent having a hydroxy group; and a plastic substrate produced by applying the foregoing to a plastic base material.

Advantageous Effects of Invention

Use of a metal-nanoparticle composite and a dispersion liquid thereof according to the present invention allows formation of a metal film having a volume resistivity of $10^{-5}$ to $10^{-6}$ Ωcm through just drying at room temperature. Specifically, according to the present invention, the baking step performed after the application of a dispersion liquid containing metal nanoparticles can be eliminated or simplified and, for example, a step of dissolving and removing a compound covering the metal nanoparticles is not necessary, hence the efficiency of the steps can be considerably enhanced. In addition, such a metal film can be formed even on a base material having low heat resistance and hence the present invention is also applicable to techniques for fine-wiring formation on various base materials.

BRIEF DESCRIPTION OF DRAWINGS

FIG. 3.2 illustrates the particle-size distribution of metal nanoparticles in a film formed by applying a dispersion liquid of a metal-nanoparticle-containing composite prepared in EXAMPLE 1 to a glass plate and drying the dispersion liquid at room temperature, the distribution being determined by subjecting the film immediately after the drying to small-angle X-ray diffractometry.

FIG. 3.3 illustrates the particle-size distribution of metal nanoparticles in a film formed by applying a dispersion liquid of a metal-nanoparticle-containing composite prepared in EXAMPLE 1 to a glass plate and drying the dispersion liquid at room temperature, the distribution being determined by subjecting the film after 6 hours elapsed from the drying to small-angle X-ray diffractometry.

FIG. 3.4 illustrates the particle-size distribution of metal nanoparticles in a film formed by applying a dispersion liquid of a metal-nanoparticle-containing composite prepared in EXAMPLE 1 to a glass plate and drying the dispersion liquid at room temperature, the distribution being determined by subjecting the film after 12.5 hours elapsed from the drying to small-angle X-ray diffractometry.

FIG. 4.2 summarizes values of the results of observation of crystallite size over time in a metal film obtained in EXAMPLE 1, the crystallite size being determined by wide-angle X-ray diffractometry.

FIG. 6.2 illustrates a differential scanning calorimetry chart of dry solid matter of an acrylic-based copolymer prepared in Synthesis example 1.

FIG. 11.2 illustrates the particle-size distribution of metal nanoparticles in a film formed by applying a dispersion liquid of a comparative metal-nanoparticle-containing composite prepared in COMPARATIVE EXAMPLE 1 to a glass plate and drying the dispersion liquid at room temperature, the distribution being determined by subjecting the film to small-angle X-ray diffractometry.

FIG. 11.3 illustrates the particle-size distribution of metal nanoparticles in a film formed by applying a dispersion liquid of a comparative metal-nanoparticle-containing composite prepared in COMPARATIVE EXAMPLE 1 to a glass plate and drying the dispersion liquid at room temperature, the distribution being determined by subjecting the film after 6 hours elapsed from the drying to small-angle X-ray diffractometry.

FIG. 11.4 illustrates the particle-size distribution of metal nanoparticles in a film formed by applying a dispersion liquid of a comparative metal-nanoparticle-containing composite prepared in COMPARATIVE EXAMPLE 1 to a glass plate and drying the dispersion liquid at room temperature, the distribution being determined by subjecting the film after 12.5 hours elapsed from the drying to small-angle X-ray diffractometry.

FIG. 12.1 illustrates the results of observation of crystallite size over time in a metal film obtained in COMPARATIVE EXAMPLE 1, the crystallite size being determined by wide-angle X-ray diffractometry.

FIG. 12.2 summarizes values of the results of observation of crystallite size over time in a metal film obtained in COMPARATIVE EXAMPLE 1, the crystallite size being determined by wide-angle X-ray diffractometry.

DESCRIPTION OF EMBODIMENTS

Figure 1:
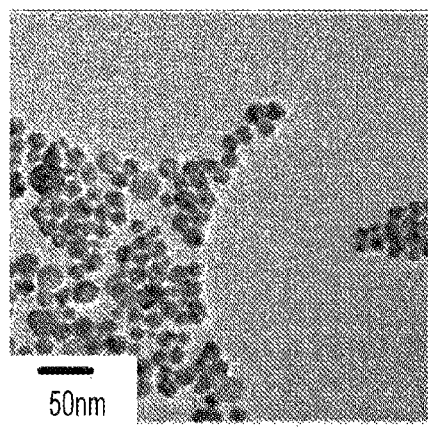
FIG. 1 is a TEM micrograph captured immediately after drying at room temperature a dispersion liquid of a metal-nanoparticle-containing composite that was prepared in EXAMPLE 1 and dropped onto a copper grid for observation with an electron microscope.

Hereinafter, the present invention will be described in detail. The inventors of the present invention considered functional groups that should be included in desired protective agents in the synthesis of metal nanoparticles on the basis of the well-known HSAB principle conceived by R. G. Pearson. According to the principle, a sulfur-containing group and a phosphate group are classified as soft bases; a silver ion is classified as a soft acid; and reducing metals such as a silver particle are also classified as soft acids. A sulfur-containing group and a phosphate group are classified as soft bases; and reducing metals such as a silver ion are classified as soft acids. The inventors considered that these functional groups and metal ions have high affinity for one another and tend to form stable bonds and hence the functional groups are in a state of being very close to the metal ions in reduction-reaction fields; the functional groups also exhibit a strong anchoring effect to generated metal surfaces so that growth of particles is suppressed to form fine particles and also enhance the stability of a colloidal solution containing the metal nanoparticles.

The sulfur-containing group that is most commonly used is a thiol group. However, the thiol group tends to have an excessively high affinity for metal surfaces and may cause blackening in the preparation of silver particles due to generation of sulfide. Accordingly, the inventors selected, as the sulfur-containing group, a functional group (b3) represented by —SR (where R represents an alkyl group having 1 to 18 carbons; a phenyl group that may optionally have a substituent on a benzene ring; or an alkyl group having 1 to 8 carbons, the alkyl group having at least one functional group selected from the group consisting of a hydroxy group, an alkoxy group having 1 to 18 carbons, an aralkyloxy group having 1 to 18 carbons, a phenyloxy group that may optionally have a substituent on a benzene ring, a carboxy group, a salt of a carboxy group, a monovalent or polyvalent alkylcarbonyloxy group having 1 to 18 carbons, and a monovalent or polyvalent alkoxycarbonyl group having 1 to 18 carbons) [hereafter, sometimes referred to as a sulfide-type sulfur functional group (b3)]; and, as the phosphate group, a phosphate residue (b2) represented by —OP(O)(OH)$_2$, because they are readily available.

In addition, polyethylene glycol is introduced into the protective agent as a functional group for enhancing solvation to achieve dispersion stability. When a metal-nanoparticle-containing composite prepared with such a protective agent is dispersed in an aqueous medium, the sulfide-type sulfur functional group and the phosphate residue both serve as soft ligands and can be bonded to the surfaces of metal nanoparticles in the coordination manner. Such a bond is not a fixed bond but is a bond in a state of high-speed dynamic equilibrium. Specifically, the sulfide-type sulfur functional group and the phosphate residue form a bonding state of coordinating to and dissociating from the surfaces of metal nanoparticles. At this time, the polyethylene glycol chains contained in the same molecule as the sulfide-type sulfur functional group and the phosphate residue function together therewith and adhere to and separate from the surfaces of metal nanoparticles; when the polyethylene glycol chains adhere to the surfaces of metal nanoparticles, they exhibit the steric repulsion effect and hence fusion of the metal nanoparticles can be suppressed. Such a state in a solution is changed by removal of the aqueous medium so that the protective agent having been dissociated aggregates together, causing phase separation between the protective agent and the metal nanoparticles. Accordingly, in a dry state, the amount of the protective agent covering the metal nanoparticles is small and a large portion of the surfaces of metal nanoparticles is exposed. Fusion of metal nanoparticles proceeds through these exposed surfaces, probably resulting in the formation of a film-shaped conductor. This is the structural model in which a conductive film is formed at room temperature in the present invention.

In addition, a metal-nanoparticle composite that can fuse at room temperature, a dispersion liquid of the composite, and a metal film formed from the dispersion liquid have been studied and, as a result, it has been considered that they probably need to have the following physico-chemical properties:

Comparison between a liquid and a coating film formed from the liquid by drying at room temperature in terms of particle-size distribution by small-angle X-ray scattering indicates the presence of a large difference therebetween;

Measurement of the crystallite size of particles dried at room temperature by wide-angle X-ray diffractometry indicates that the crystallite size increases with time; and In differential scanning calorimetry of solid dried at room temperature, an exothermic peak corresponding to the melting point is not observed in the calorimetry with a temperature rise up to 200° C.

As described below, it has been confirmed that a metal-nanoparticle-containing composite, a dispersion liquid of the composite, and a metal film formed from the foregoing according to the present invention satisfy the above-described three physico-chemical properties; and it has been demonstrated that fusion proceeds at room temperature (up to 30° C.) This is never achieved only on the basis of an idea of applying a compound conventionally known as a polymeric pigment dispersing agent to metal nanoparticles.

[Methods for Producing Metal-Nanoparticle-Containing Composite]

A first method for producing a metal-nanoparticle-containing composite according to the present invention, includes (I) a step of dissolving, in an aqueous medium, a (meth)acrylic-based polymer (B1) prepared through polymerization of a (meth)acrylate-based macromonomer (x1) having a polyethylene glycol chain (b1) in the presence of a chain transfer agent (x3) having a functional group (b3) represented by —SR (where R represents an alkyl group having 1 to 18 carbons; a phenyl group that may optionally have a substituent on a benzene ring; or an alkyl group having 1 to 8 carbons, the alkyl group having at least one functional group selected from the group consisting of a hydroxy group, an alkoxy group having 1 to 18 carbons, an aralkyloxy group having 1 to 18 carbons, a phenyloxy group that may optionally have a substituent on a benzene ring, a carboxy group, a salt of a carboxy group, a monovalent or polyvalent alkylcarbonyloxy group having 1 to 18 carbons, and a monovalent or polyvalent alkoxycarbonyl group having 1 to 18 carbons) and a (meth)acrylic-based polymer (B2) prepared through polymerization of a (meth)acrylate-based monomer (x2) having a phosphate residue (b2) represented by —OP(O)(OH)$_2$ in the presence of a chain transfer agent (x3) having a functional group (b3) represented by —SR (where R has the same definition as above);

(II) a step of adding a metal compound (A) or an aqueous solution of the metal compound (A) to an aqueous solution prepared in (I); and (III) a step of dropping a reducing agent (C), an aqueous solution of the reducing agent (C), or an aqueous solution containing the (meth)acrylic-based polymer (B1) and/or the (meth)acrylic-based polymer (B2) and the reducing agent (C), into a mixed solution prepared in (II).

A second production method includes (I') a step of dissolving, in an aqueous medium, a (meth)acrylic-based polymer (B3) prepared through polymerization of a (meth)acrylate-based macromonomer (x1) having a polyethylene glycol chain (b1) and a (meth)acrylate-based monomer (x2) having a phosphate residue (b2) represented by —OP(O)(OH)$_2$ in the presence of a chain transfer agent (x3) having a functional group (b3) represented by —SR (where R has the same definition as above);

(II') a step of adding a metal compound (A) or an aqueous solution of the metal compound (A) to an aqueous solution prepared in (I'); and (III') a step of dropping, into a mixed solution prepared in (II'), a reducing agent (C), an aqueous solution of the reducing agent (C), or an aqueous solution containing the reducing agent (C) and at least one (meth)acrylic-based polymer selected from the group consisting of the (meth)acrylic-based polymer (B1), the (meth)acrylic-based polymer (B2), and the (meth)acrylic-based polymer (B3).

In the present invention, metal nanoparticles have a particle size of nanometer order, in particular, 2 to 50 nm. The average particle size of metal nanoparticles is determined in the following manner: a droplet of a dispersion liquid of the metal nanoparticles described below is dropped on a copper grid having a Formvar film for observation with an electron microscope; the droplet is observed with a transmission electron microscope JEM-2200FS (200 kv, manufactured by JEOL Ltd., hereafter abbreviated as TEM); 100 particles are randomly selected from a captured micrograph; and the average particle size of these particles is calculated as the average particle size of the metal nanoparticles. Accordingly, metal nanoparticles do not need to have the shape of a perfect sphere; when such a metal nanoparticle is observed so as to have an elliptical shape, the longest size of the nanoparticle is defined as the particle size of the particle.

The metal-nanoparticle-containing composites produced by the first and second production methods are designed such that the (meth)acrylic-based polymers function as protective agents for stabilizing metal nanoparticles in an aqueous medium; and, as described above, the sulfide-type sulfur functional group, the phosphate residue, and the polyethylene glycol chain are present in the (meth)acrylic-based polymers. The sulfide-type sulfur functional group is present at ends of the polymers. The phosphate residue and the polyethylene glycol chain are present as side chains of the (meth)acrylic-based polymers. In the first production method, the phosphate residue and the polyethylene glycol chain are present in different molecules. In the second production method, a copolymer containing the phosphate residue and the polyethylene glycol chain in the same molecule is contained.

In the first and second production methods, the (meth) acrylate-based macromonomer (x1) that has the polyethylene glycol chain (b1) and is used as a raw material of a (meth) acrylic-based polymer serving as a protective agent is, for example, a (meth)acrylate (hereafter, this term collectively represents both acrylate and methacrylate) of polyethylene glycol having a polymerization degree of 2 to 50 or a block copolymer of propylene oxide and 2 to 50 repeating units of ethylene oxide; or a (meth)acrylate of polyethylene glycol having a polymerization degree of 2 to 50 in which an end is capped with an alkyl group having 1 to 6 carbons or a block copolymer of propylene oxide and 2 to 50 repeating units of ethylene oxide. Examples of commercially available products include NK Ester M-20G, M-40G, M-90G, M-230G, M-450G, AM-90G, 1G, 2G, 3G, 4G, 9G, 14G, 23G, 9PG, A-200, A-400, A-600, APG-400, and APG-700, manufactured by Shin Nakamura Chemical Co., Ltd.; and BLEMMER PE-90, PE-200, PE-350, PME-100, PME-200, PME-400, PME-4000, 70FEP-350B, 55PET-800, 50POEP-800B, NKH-5050, PDE-50, PDE-100, PDE-150, PDE-200, PDE-400, PDE-600, AP-400, AE-350, ADE-200, and ADE-400, manufactured by NOF CORPORATION. These examples may be used alone or in combination of two or more thereof.

Examples of the (meth)acrylate-based monomer (x2) having the phosphate residue (b2) represented by —OP(O)(OH)$_2$ include, as commercially available monomers, LIGHT ESTER P-1M manufactured by Kyoeisha Chemical Co., Ltd.; and Phosmer M and Phosmer PE manufactured by Uni-Chemical Co., Ltd. Since (meth)acrylic acid ester phosphates having desired structures can be easily prepared by a reaction between a (meth)acrylic acid hydroxy ester and a phosphoric acid esterification reagent such as phosphorus oxychloride or dichlorophosphoric acid phenyl, they may be used. The foregoing may be used alone or in combination of two or more thereof.

In the present invention, by using the chain transfer agent (x3) having the functional group (b3) represented by —SR (where R has the same definition as above) in the synthesis of a (meth)acrylic-based polymer, the functional group (b3) can be introduced into an end of the resultant (meth)acrylic-based polymer. Specifically, the preparation of the (meth)acrylic-based copolymer (B) through radical polymerization requires use of the chain transfer agent (x3) having a moiety represented by —SR (where R has the same definition as above): examples of the chain transfer agent (x3) include various thiol compounds (alkanethiols, thiolalcohols, thiolcarboxylic acid, and thiolesters).

The alkyl group having 1 to 18 carbon atoms serving as the functional group (b3) may be linear or branched or may have an alicyclic structure; examples thereof include alkyl groups such as a methyl group, an ethyl group, a propyl group, an isopropyl group, a butyl group, an isobutyl group, a hexyl group, a 2-ethylhexyl group, an octyl group, a decyl group, and a dodecyl group. In particular, an octyl group, a decyl group, and a dodecyl group are preferred in view of the effect of adhesion to metal surfaces and low volatility (low odor) of the thiol compounds.

As for the functional group (b3), specific examples of the alkyl group having 1 to 8 carbons, the alkyl group having at least one functional group selected from the group consisting of a hydroxy group, an alkoxy group having 1 to 18 carbons, an aralkyloxy group having 1 to 18 carbons, a phenyloxy group that may optionally have a substituent on a benzene ring, a carboxy group, a salt of a carboxy group, a monovalent or polyvalent alkylcarbonyloxy group having 1 to 18 carbons, and a monovalent or polyvalent alkoxycarbonyl group having 1 to 18 carbons, include: a 2-hydroxyethyl group, a 2-hydroxypropyl group, a 3-hydroxypropyl group, a 8-hydroxyoctyl group, a 2,3-dihydroxypropyl group, a 2-methoxyethyl group, a 2-ethoxyethyl group, a 2-hexyloxyethyl group, a 2-(2-ethylhexyloxy)ethyl group, a 2-benzyloxyethyl group, a 2-(4-methoxybenzyloxy)ethyl group, a 2-phenyloxyethyl group, a 2-(4-methoxyphenyloxy)ethyl group, a 2-(2,4-dimethoxyphenyloxy)ethyl group, a 6-(4-hydroxymethylphenyloxy)hexyl group, a 2-acetoxyethyl group, a 2-heptanoyloxyethyl group, a 2-octanoyloxyethyl group, a 2-octadecanoyloxyethyl group, a 2-isobutyryloxyethyl group, a 2-pivaloyloxyethyl group, a carboxymethyl group, a 2-carboxyethyl group, a 7-carboxyheptyl group, a 1-carboxyethyl group, a 1,2-dicarboxyethyl group, inorganic salts, ammonium salts, and organic amine salts of these carboxylic acids, a methoxycarbonylmethyl group, an ethoxycarbonylmethyl group, an octyloxycarbonylmethyl group, a 2-(methoxycarbonyl)ethyl group, a 2-(octyloxycarbonyl)ethyl group, a 2-(dodecyloxycarbonyl)ethyl group, a 2-(2-(methoxyethoxy)carbonyl)ethyl group, a 2-(methoxyethoxyethoxycarbonyl)ethyl group, a 2-(4-methoxybutoxycarbonyl)ethyl group, a 2-(2-ethylhexyloxycarbonyl)methyl group, a 2-(2-ethylhexyloxycarbonyl)ethyl group, and a 2-(3-methoxybutoxycarbonyl)ethyl group.

Of these, preferred are a 2-(methoxycarbonyl)ethyl group, a 2-(2-ethylhexyloxycarbonyl)ethyl group, a 2,3-dihydroxypropyl group, a 2-hydroxyethyl group, and a carboxymethyl group, in view of availability, the conductivity of the resultant metal nanoparticles and the smoothness of the film formed.

Specific examples of a compound serving as the chain transfer agent (x3) usable in the present invention include thioglycol, 2-mercaptopropanol, 3-mercaptopropanol, 8-mercaptooctanol, 2,3-dihydroxypropanethiol, 2-methoxyethanethiol, 2-ethoxyethanethiol, 2-hexyloxyethanethiol, 2-(2-ethylhexyloxy)ethanethiol, 2-benzyloxyethanethiol, 2-(4-methoxybenzyloxy)ethanethiol, 2-phenyloxyethanethiol, 2-(4-methoxyphenyloxy)ethanethiol, 2-(2,4-dimethoxyphenyloxy)ethanethiol, 6-(4-hydroxymethylphenyloxy)hexanethiol, 2-acetoxyethanethiol, 2-heptanoyloxyethanethiol, 2-octanoyloxyethanethiol, 2-octadecanoyloxyethanethiol, 2-isobutyryloxyethanethiol, 2-pivaloyloxyethanethiol, thioglycolic acid, β-mercaptopropionic acid, 7-mercaptooctanoic acid, 2-mercaptopropionic acid, 2-mercaptosuccinic acid, inorganic salts, ammonium salts, and organic amine salts of these carboxylic acids, methyl thioglycolate, ethyl thioglycolate, octyl thioglycolate, ethyl β-mercaptopropionate, octyl β-mercaptopropionate, dodecyl β-mercaptopropionate, 2-(methoxyethyl) β-mercaptopropionate, 2-(methoxyethoxyethoxy) β-mercaptopropionate, 2-(4-methoxybutoxy) β-mercaptopropionate, 2-ethylhexyl thioglycolate, 2-ethylhexyl β-mercaptopropionate, and 3-methoxybutoxy β-mercaptopropionate. These examples may be used alone or in combination of two or more thereof. Of these, thioglycol, 2,3-dihydroxypropanethiol, thioglycolic acid, β-mercaptopropionic acid, ethyl β-mercaptopropionate, and 2-ethylhexyl β-mercaptopropionate are preferred in view of reactivity, availability, and surface smoothness of the resultant film.

In the present invention, as for the (meth)acrylic-based polymers (B1), (B2), and (B3) that are used as protective agents, when the weight-average molecular weight determined by gel permeation chromatography in terms of polystyrene is excessively low, the capabilities of maintaining the fine-particle state of metal nanoparticles are not sufficiently provided and fusion of the metal nanoparticles may proceed during storage in the form of a dispersion liquid; when the molecular weight is excessively high, for example, precipitation of the composite may occur in the dispersion liquid. Accordingly, the weight-average molecular weight is preferably in a range of 3,000 to 10,000, particularly preferably, in a range of 4,000 to 8,000. For this reason, the amount of the chain transfer agent used is preferably made larger in the present invention than that in general synthesis of acrylic-based polymers through radical polymerization.

Specifically, the molar amount of the chain transfer agent (x3) used is preferably 0.05 to 0.5 times, more preferably 0.08 to 0.3 times, the total number of moles of (meth)acrylate-based monomers used as raw materials.

The existence ratio of the polyethylene glycol chain (b1), the phosphate residue (b2), and the sulfide-type sulfur functional group (b3) in (meth)acrylic-based polymers serving as protective agents in the present invention preferably satisfies polyethylene glycol chain:phosphate residue:sulfide-type sulfur functional group=1.0 to 15.0:0.3 to 5.0:1.0, more preferably 2.0 to 10.0:0.5 to 3.0:1.0, because storage stability of the composite being dispersed and fusion capabilities at room temperature can be sufficiently achieved.

Accordingly, in the first production method, the mixing ratio of the meth(acrylic)-based polymer (B1) to the (meth)acrylic-based polymer (B2) is generally in a range of 20/1 to 1/1 (molar ratio), preferably in a range of 20/1 to 2/1, most preferably in a range of 20/1 to 10/1.

In the second production method, as for the usage ratio of the (meth)acrylate-based macromonomer (x1) having the polyethylene glycol chain (b1) to the (meth)acrylate-based monomer (x2) having the phosphate residue (b2) that serve as raw materials, a molar ratio (x1)/(x2) is preferably in a range of 1/2 to 10/1, particularly preferably in a range of 2/3 to 7/1.

The acrylic-based polymers (B1), (B2), and (B3), which are used in the present invention and necessarily include the above-described functional groups, may further include, for example, other functional groups unless advantages of the present invention are degraded. Specifically, when a copolymer is prepared from acrylic-based monomers, the above-described monomers (x1) and (x2) may be used in combination with another radical-polymerizable monomer (x).

Examples of the other radical-polymerizable monomer (x) include (meth)acrylic acid, methyl(meth)acrylate, benzyl (meth)acrylate, 2-dimethylaminoethyl(meth)acrylate, and sulfoethyl(methacrylate). When such another radical-polymerizable monomer (x) is used in combination, the usage proportion thereof with respect to the total monomers is preferably 10 mol % or less.

In the second production method, the (meth)acrylic-based polymer (B3) is a mixture of the (meth)acrylic-based polymer (B1), which is a homopolymer of the (meth)acrylate-based macromonomer (x1) having the polyethylene glycol chain (b1); the (meth)acrylic-based polymer (B2), which is a homopolymer of the (meth)acrylate-based monomer (x2) having the phosphate residue (b2); and a (meth)acrylic-based copolymer having the polyethylene glycol chain (b1) and the phosphate residue (b2) as side chains. From this mixture, the (meth)acrylic-based copolymer may be isolated through purification and provided to the subsequent step. However, in view of, for example, time and cost for the purification, the mixture is preferably used without being purified in the subsequent step.

The concentration in the dissolution of the mixture of the (meth)acrylic-based polymers (B1) and (B2) in an aqueous medium in the step (I), and the concentration of the (meth) acrylic-based polymer (B3) in the step (I') are preferably adjusted to be 3 to 15 mass % because uniform dissolution is achieved and, in the steps (III) and (III'), that is, in the steps of forming metal nanoparticles through a reduction reaction of metal ions, the reduction reaction mildly proceeds so that metal nanoparticles having a uniform particle size tend to be formed. The aqueous medium used herein may be water alone or, for the purpose of adjusting the solubility of the (meth) acrylic-based polymer (B1), (B2), or (B3), a mixture of water and an organic solvent that is sufficiently miscible with water, the organic solvent being preferably an alcohol, a water-soluble ether, a water-soluble ketone, a carboxyamide, a phosphoroamide, a sulfoxide, or the like.

In the steps (I) and (I'), an organic amine may be added so that the phosphate residue (b1) can be effectively bonded to the surfaces of metal nanoparticles formed in the aqueous medium and the control of an increase in the particle size of the metal nanoparticles is facilitated. In particular, when the reaction is performed at a high concentration, such an organic amine is preferably added.

Examples of the organic amine include triethylamine, butylamine, dibutylamine, diisopropylethylamine, and N-methylmorpholine. The organic amines may be used alone or in combination of two or more thereof. The addition amount is preferably 0.5 to 2 equivalent amount with respect to the measured acid value of a mixture of the (meth)acrylic-based polymers (B1) and (B2) used or the (meth)acrylic-based polymer (B3) used.

In the steps (II) and (II'), the metal compound (A) or the aqueous solution of the metal compound (A) that can cause the formation of metal nanoparticles (A') through a reduction reaction is added to the aqueous solution of the (meth)acrylic-based polymer prepared in the steps (I) and (I'). The aqueous solution denotes a solution prepared through dissolution in the aqueous medium.

The metal species in the metal compound (A) is not particularly limited as long as nanoparticles can be formed through a reduction reaction so as to be protected by the mixture of the (meth)acrylic-based polymers (B1) and (B2) or the (meth)acrylic-based polymer (B3). In view of the availability of the raw material and the usefulness of, as conductive materials, the resultant metal-nanoparticle-containing composite and a dispersion liquid thereof, the metal species are preferably gold, silver, copper, and platinum metals (ruthenium, rhodium, palladium, osmium, iridium, and platinum); more preferably silver, gold, platinum, palladium, ruthenium, rhodium, and copper; most preferably silver, gold, platinum, and copper.

Examples of the metal compound (A) include various salts and oxides. In view of solubility, preferred examples include acetates, nitrates, sulfates, chlorides, and acetylacetonates. In particular, nitrates and acetates are preferred. Even an insoluble compound such as a metal oxide may be used when a complexing agent such as ammonia, an amine compound, a hydrazine, or a hydroxylamine is used to be coordinated to the metal ions so that a soluble complex compound can be formed.

For example, when the metal element is gold or a platinum metal, tetrachloroauric acid, tetrachloroplatinic acid, palladium nitrate, palladium acetate, palladium chloride, palladium oxide, palladium sulfate, or the like may be used. When the metal species is copper, for example, $Cu(OAc)_2$, $Cu(NO_3)_2$, $CuCl_2$, $Cu(HCOO)_2$, $Cu(CH_3COO)_2$, $Cu(CH_3CH_2COO)_2$, $CuCO_3$, $CuSO_4$, $C_5H_7CuO_2$, or a basic salt prepared by heating a carboxylate such as $Cu(OAc)_2 \cdot CuO$ may be used. When the metal species is silver, for example, silver nitrate, silver oxide, silver acetate, silver chloride, or silver sulfate may be used. In the case of usage in the form of an aqueous solution, silver nitrate is preferred in view of its solubility.

Although the proportion of the metal compound (A) used is not particularly limited, it is preferably in a range of 3 to 15 mass % with respect to the total mass of the (meth)acrylic-based polymer(s) in the mixture of the (meth)acrylic-based polymers (B1) and (B2) prepared in the step (I) or in the aqueous solution of the (meth)acrylic-based polymer (B3) prepared in the step (I'). Although the concentration of the metal compound (A) is properly determined in accordance with the solubility of the metal compound used to the aqueous medium, it is generally preferably adjusted to be in a range of 5 to 20 mass % in view of ease of handling and the volumetric efficiency of a reactor.

In the steps (III) and (III'), a reduction reaction of metal ions is caused. For the purpose of making the reduction reaction mildly proceed so that the resultant metal nanoparticles are stabilized, the reducing agent (C) may be prepared in the form of an aqueous solution in advance, or an aqueous mixed solution of the reducing agent (C) and the (meth)acrylic-based polymer (B1), (B2), or (B3) may be used. By mixing such a solution dropwise with the aqueous solution prepared in the step (II) or (II'), the reduction reaction proceeds.

Compounds that can be used as the reducing agent (C) are not particularly limited. Examples of inorganic reducing agents include hydrazine and hydroxylamine. Examples of organic reducing agents include hydroxylamine-based compounds such as a N,N-dialkylhydroxylamine; hydrazine-based compounds such as a N,N-dialkylhydrazine; phenols such as hydroquinone and aminophenol; phenylenediamines; hydroxyketones and hydroxycarboxylic acids such as 2-hydroxyacetone, 2-hydroxyhexane-1,3-dione, and malic acid; and enediols such as ascorbic acid and 2,3-dihydroxymaleic acid. For the reduction of precious-metal compounds, amino alcohols and amine compounds such as triethanolamine used as reducing agents in electroless plating may be used.

In the mixed solution of the reducing agent and the (meth)acrylic-based polymer (B1), (B2), or (B3), the mixed solution being prepared in advance, the medium is preferably water alone. The amount of the reducing agent used is sufficiently large to reduce metal ions by the time when dropping is completed; in general, the amount in mol is preferably 1 to 10 times the number of moles of the metal ions. The usage proportion of the (meth)acrylic-based polymer (B1), (B2), or (B3) is preferably in a range of 1 to 50 wt % with respect to the theoretical yield of reduced metal.

The rate at which the reducing agent is added is not particularly limited and may be adjusted in accordance with the reducing power of the reducing agent with respect to metal species. When a reducing agent having a high reducing power is used, it is preferably diluted and added at a low rate because the resultant particles have a narrow particle-size distribution, which is advantageous. In this case, the dropping is desirably completed after 0.5 to 3 hours has elapsed in view of productivity. Alternatively, when a mild reducing agent that can cause the reaction upon heating is used, the entirety thereof may be added at one time.

After the addition is finished, to complete the reduction reaction so that the resultant metal nanoparticles are sufficiently protected, stirring is preferably further performed. A method for performing this stirring is not particularly limited. The time for which the stirring is performed is also not limited.

As a result of the above-described steps, a metal-nanoparticle-containing composite is obtained. At this time, the composite in which the content of metal nanoparticles is 90 mass % or more is obtained; and even a composite in which the content is 92 to 98 mass %, the composite being suitably used as a conductive material, can be readily obtained. The metal nanoparticles have an average particle size of 2 to 50 nm.

When the metal-nanoparticle-containing composite obtained herein is used as a conductive material, it is preferably used after, for example, unnecessary ions that are by-products, the (meth)acrylic-based polymer (B1), (B2), or (B3) that does not contribute to protection (covering) of the metal nanoparticles, and the reducing agent are removed, and the composite is then dispersed in a desired medium. At this time, when the metal-nanoparticle-containing composite is precipitated (dried), as the medium evaporates, the (meth)acrylic-based polymer (B1), (B2), or (B3) serving as the protective agent gradually becomes separated from the surfaces of the metal nanoparticles and fusion of the metal nanoparticles proceeds. To suppress the occurrence of such phenomena, the composite needs to be purified and concentrated at least in the presence of water. Specifically, preferred examples of the purification method include ultrafiltration and centrifugal separation.

Specific process of the ultrafiltration method is not particularly limited. In general, the crossflow process using a flat-membrane module or a hollow-fiber module is industrially used and it may also be employed in the present invention.

The purification may be performed by the ultrafiltration method in combination with the centrifugal-separation method and another purification method such as a precipitation method performed by adding a water-soluble solvent. Since the fusion of a composite according to the present invention easily proceeds through drying at room temperature, a step of completely removing the medium is not preferably performed.

A dispersion liquid of the metal-nanoparticle-containing composite is obtained in the following manner: as described above, the metal-nanoparticle-containing composite is purified and concentrated without being precipitated and at least in the presence of water, and then dispersed in at least one solvent selected from the group consisting of water and organic solvents having a hydroxy group. Depending on the purpose, the concentration of the dispersion liquid may be adjusted and the solvent of the dispersion liquid may be changed.

Examples of the organic solvents having a hydroxy group include alcohols such as methanol, ethanol, isopropyl alcohol, and n-propyl alcohol; and glycols such as ethylene glycol, propylene glycol, ethylene glycol monomethyl ether, and propylene glycol monomethyl ether. These solvents may be used alone or in combination of two or more thereof, or may be mixed with water and used. Aromatic hydrocarbon solvents also sufficiently serve as dispersion media for the metal-nanoparticle composite. Examples of the aromatic hydrocarbon solvents include benzene, toluene, and xylene.

Although the content of the metal-nanoparticle-containing composite in the dispersion liquid is properly selected in accordance with the intended use of the dispersion liquid, it is generally preferably 10 to 85 mass %; more preferably, it is adjusted to be in a range of 20 to 70 mass % because drying at room temperature is readily performed and the resultant metal film has a high conductivity.

[Metal-Nanoparticle-Containing Composite and Dispersion Liquid Thereof]

A metal-nanoparticle-containing composite according to the present invention includes metal nanoparticles (A') that have a particle size of 2 to 50 nm and are covered with a (meth)acrylic-based polymer (B), wherein the (meth)acrylic-based polymer (B) includes a (meth)acrylic-based polymer (B1) that has, at at least one end, a functional group (b3) represented by —SR (where R has the same definition as above), and has a polyethylene glycol chain (b1) as a side chain, and a (meth)acrylic-based polymer (B2) that has, at at least one end, a functional group (b3) represented by —SR (where R has the same definition as above) and has, as a side chain, a phosphate residue (b2) represented by —OP(O)(OH)$_2$.

The (meth)acrylic-based polymer (B) may further include a (meth)acrylic-based copolymer that has, at at least one end, a functional group (b3) represented by —SR (where R has the same definition as above) and has, as side chains, a polyethylene glycol chain (b1) and a phosphate residue (b2) represented by —OP(O)(OH)$_2$.

Since the metal nanoparticles (A') are prepared through the reduction reaction of the metal ions of the above-described metal compound (A), the metal species thereof is the same as that of the metal compound (A) used.

The (meth)acrylic-based polymer (B) is a mixture of the (meth)acrylic-based polymers (B1) and (B2) or the (meth) acrylic-based polymer (B3), and it preferably has a weight-average molecular weight in a range of 3,000 to 10,000.

The content of the metal nanoparticles (A') in the metal-nanoparticle-containing composite is preferably 90 mass % or more, particularly preferably 92 to 98 mass %, because the composite can be suitably used as a conductive material.

A dispersion liquid of a metal-nanoparticle-containing composite according to the present invention is prepared by dispersing the metal-nanoparticle-containing composite in at least one solvent selected from the group consisting of water and an organic solvent having a hydroxy group. Dispersion in an organic solvent having no hydroxy groups can be achieved by performing solvent displacement to an organic solvent having a hydroxy group and then further changing the solvent. The concentration is not particularly limited and can be properly determined in accordance with, for example, the intended use; the concentration is preferably in a range of 10 to 85 mass % in view of ease of handling. The organic solvent having a hydroxy group may be selected from the above-described solvents. A method for producing the dispersion liquid is preferably the above-described method because the dispersion can be efficiently obtained.

[Metal Film]

Metal films having conductivity can be obtained by applying an as-prepared dispersion liquid of a metal-nanoparticle-containing composite according to the present invention, or various compositions (such as a composition for a coating material, a composition for bonding, and an aqueous ink) containing the dispersion liquid, to base materials and drying the base materials. In the present application, metal films encompass coating films formed by application in wide areas, films filling gaps between bonding portions, and narrow wires on the micrometer order such as fine wiring.

The base materials usable herein are not particularly limited. Since a dispersion liquid of a metal-nanoparticle-containing composite according to the present invention does not require heating, a solvent treatment, or the like for achieving fusion, the substrate can be selected without particular consideration of heat resistance or solvent resistance; the dispersion liquid can be applied to various base materials or can be used to draw electrical wiring on various base materials. In summary, the base material is not limited and examples of usable material include thermoplastic resin, thermosetting resin, glass, paper, metal, and ceramic.

Examples of the thermoplastic resin include polyethylene terephthalate, polyethylene naphthalate, aromatic polyamides, polycarbonate, and thermoplastic polyimide. Suitability for these is important in view of flexibility. Examples of the thermosetting resin include phenolic resins, epoxy resins, unsaturated polyesters, and thermosetting polyimide resins. By using such a resin for the base material, a plastic substrate according to the present invention can be easily obtained. A ceramic that is often used for an integrated circuit substrate, such as alumina, aluminum nitride, silicon nitride or silicon carbide, may be used for the substrate.

The drying conditions after application are conditions under which volatile components in a dispersion liquid or a composition containing the dispersion liquid can be removed, and a metal film having conductivity is formed without performing warming, heating, or the like. In particular, when a dispersion liquid of a metal-nanoparticle-containing composite according to the present application is applied as prepared above, a metal film obtained by drying at 1° C. to 30° C. exhibits a volume resistivity of 50 µΩcm or less, and the metal film exhibits no exothermic peaks derived from fusion of metal nanoparticles in differential scanning calorimetry performed at −20° C. to 150° C.; these properties are not observed in existing compositions containing metal nanoparticles.

The no exhibition of exothermic peaks derived from fusion of metal nanoparticles denotes that, in the temperature range, clear peaks of 1 J/g or more cannot be observed except for an endothermic change probably derived from a (meth)acrylic-based polymer serving as a protective agent (endothermic change probably caused through glass transition of a (meth) acrylic-based copolymer in a low-temperature range of 10° C. to 30° C.)

When a dispersion liquid according to the present invention is applied and left for 6 hours at 20° C. to 30° C., it has a volume resistivity of 10 µΩcm or less; accordingly, it has been demonstrated that fusion of the metal nanoparticles (A) proceeds by simply leaving the dispersion liquid at room temperature. Specifically, a coating film was formed and dried at room temperature; immediately after the formation of the coating film, it had a volume resistivity on the order of $10^{-5}$ Ωcm; after the coating film was left for several hours, it had a resistivity of 7 to 9×$10^{-6}$ Ωcm; after one week or more elapsed, the coating film had a low resistivity of about 4 to 6×$10^{-6}$ Ωcm.

The inventors of the present invention further performed analyses by using differential scanning calorimetry, small-angle X-ray diffractometry, and wide-angle X-ray diffractometry to confirm whether fusion of the metal nanoparticles (A) occurred at room temperature (20° C. to 30° C.) Hereinafter, a metal film formed from a dispersion liquid of a composite obtained in EXAMPLE 1 will be described as an example.

Figure 3:
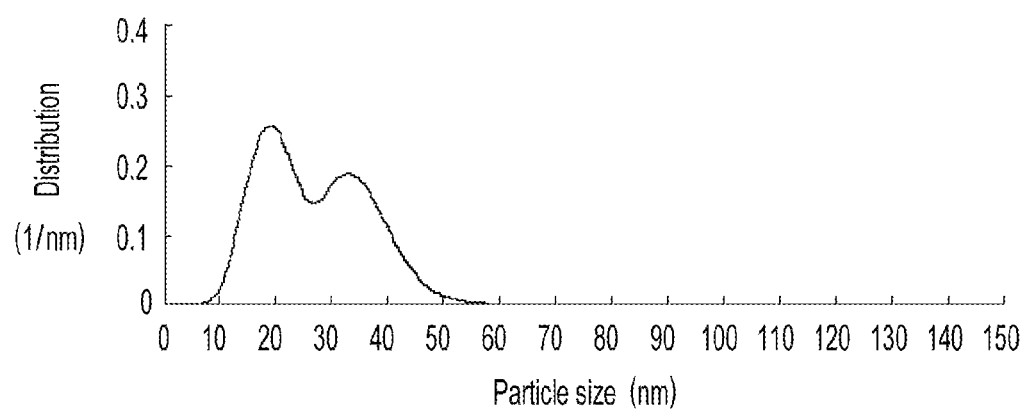
FIG. 3.1 illustrates the particle-size distribution of metal nanoparticles, the distribution being determined by subjecting a dispersion liquid of a metal-nanoparticle-containing composite prepared in EXAMPLE 1 to small-angle X-ray diffractometry.

According to small-angle X-ray scattering, it was found that the composite in the dispersion liquid had a particle-size distribution in a range of 10 to 50 nm (FIG. 3.1); however, the composite having been dried had a totally different particle-size distribution that extended as far as beyond 100 nm (FIG. 3.2). This distribution gradually extends over 12.5 hours (FIG. 3.3 and FIG. 3.4), which indicates that the fusion proceeds over time.

Figure 5:
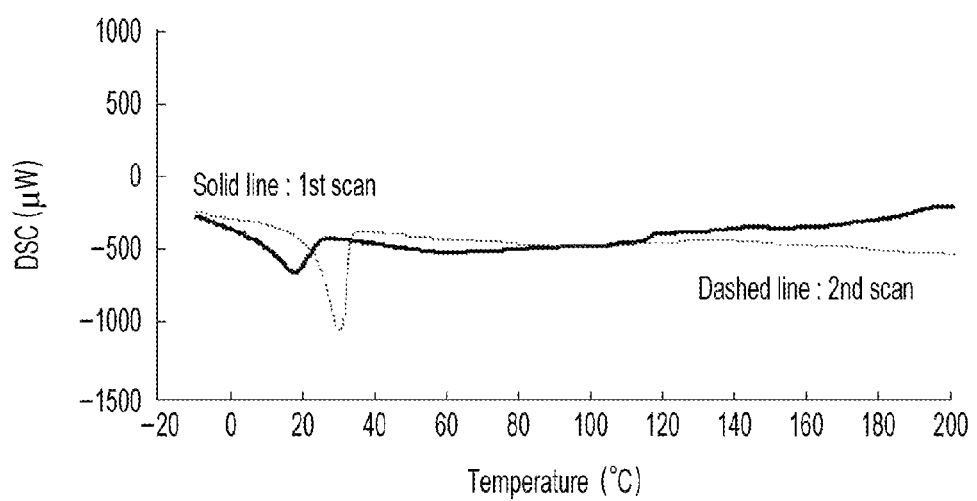
FIG. 5 illustrates a differential scanning calorimetry chart of dry solid matter of a metal-nanoparticle-containing composite prepared in EXAMPLE 1.
Figure 6:
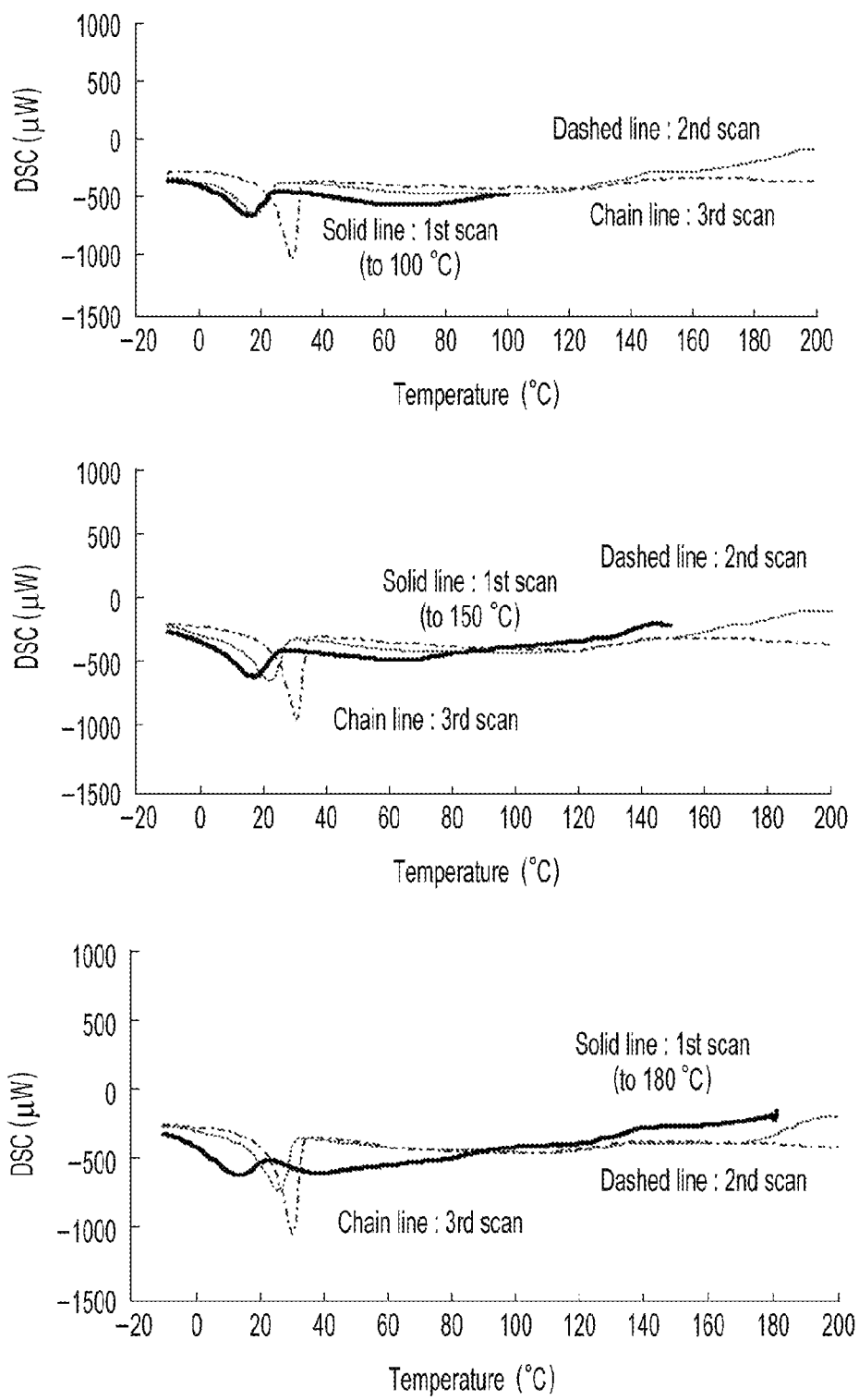
FIG. 6.1 illustrates charts of differential scanning calorimetry in which the first scans for dry solid matter of a metal-nanoparticle-containing composite prepared in EXAMPLE 1 were performed at 100° C., 150° C., and 180° C.
Figure 6:
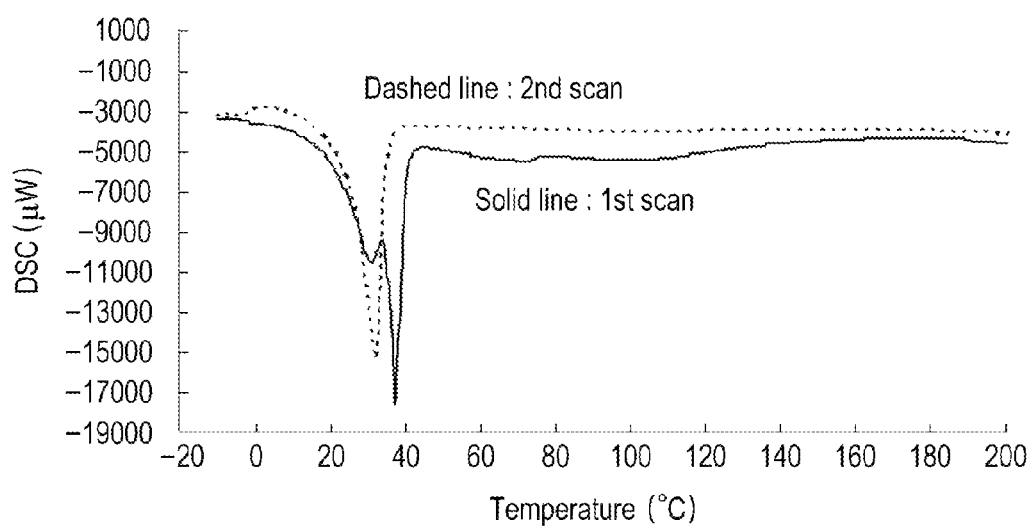

When the metal film dried at room temperature was subjected to differential scanning calorimetry, an endothermic change probably derived from the (meth)acrylic-based polymer serving as a protective agent was observed even in the first scan (FIG. 5). Since a protective agent that is adhering to metal surface does not exhibit Tg, no endothermic change derived from the protective agent is generally observed in the first scan of a metal film formed from a composition containing metal nanoparticles. Accordingly, separation of the protective agent at room temperature clearly occurs in a composite according to the present invention. Measurements in which the first scans were performed at different upper-limit temperatures indicate that, in the second scan, the higher the temperature, the larger the separation amount of the resin becomes; the larger the separation amount becomes, the more similar the DSC pattern becomes to the DSC pattern obtained from the protective agent alone (FIG. 6.1 and FIG. 6.2).

On the other hand, observation of crystallite size over time by wide-angle X-ray diffractometry indicates that the silver nanoparticles immediately after the formation of the coating film had a crystallite size of 11 nm, which increased to 12 nm in 6 hours and 15 nm in 12.5 hours, the increase corresponding to about 36% growth (FIG. 5). This indicates that the particles have amorphous regions (amorphousness) even immediately after being dried. In the dispersion liquid, while the —SR group and phosphate residue of the (meth)acrylic-based polymer serving as a protective agent strongly adhere to the surfaces of metal nanoparticles to suppress precipitation due to agglomeration, their capability of stabilizing particles having a small particle size probably contributes to maintaining of the amorphousness. However, when a coating film is formed by drying, the protective agent rapidly becomes separated from the metal surfaces and, after that, crystallization probably gradually proceeds. The capability of fusion at room temperature is achieved by separation of the protective agent easily caused by drying and the amorphousness of the fine particles.

Figure 9:
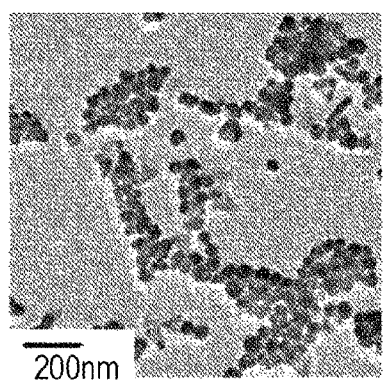
FIG. 9 is a TEM micrograph captured immediately after drying at room temperature a dispersion liquid of a comparative metal-nanoparticle-containing composite that was prepared in COMPARATIVE EXAMPLE 1 and dropped onto a copper grid for observation with an electron microscope.
Figure 10:
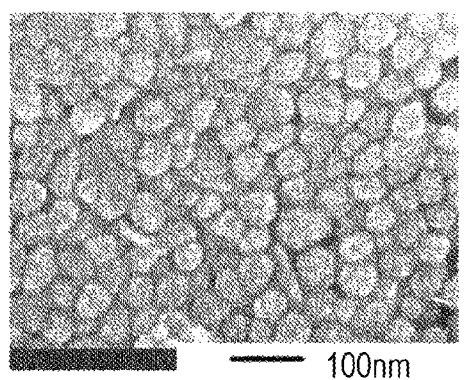
FIG. 10 is a SEM micrograph of a film formed by applying a dispersion liquid of a comparative metal-nanoparticle-containing composite prepared in COMPARATIVE EXAMPLE 1 onto a glass plate and drying the dispersion liquid at room temperature.
Figure 11:
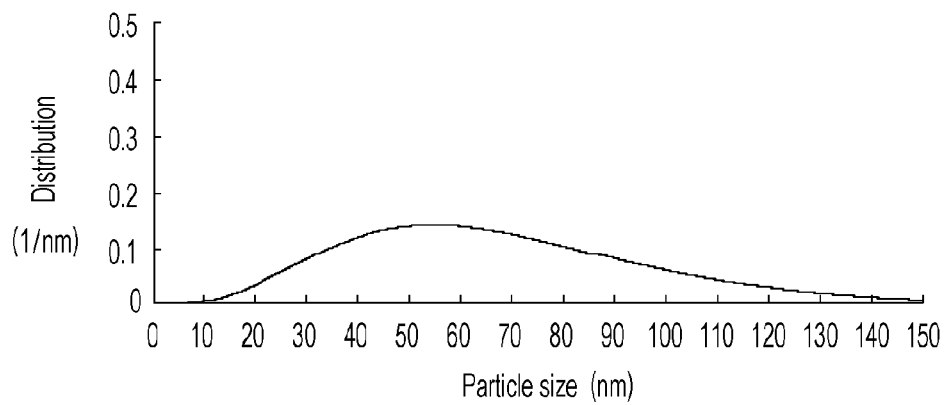
FIG. 11.1 illustrates the particle-size distribution of metal nanoparticles, the distribution being determined by subjecting a dispersion liquid of a comparative metal-nanoparticle-containing composite prepared in COMPARATIVE EXAMPLE 1 to small-angle X-ray diffractometry.
Figure 11:
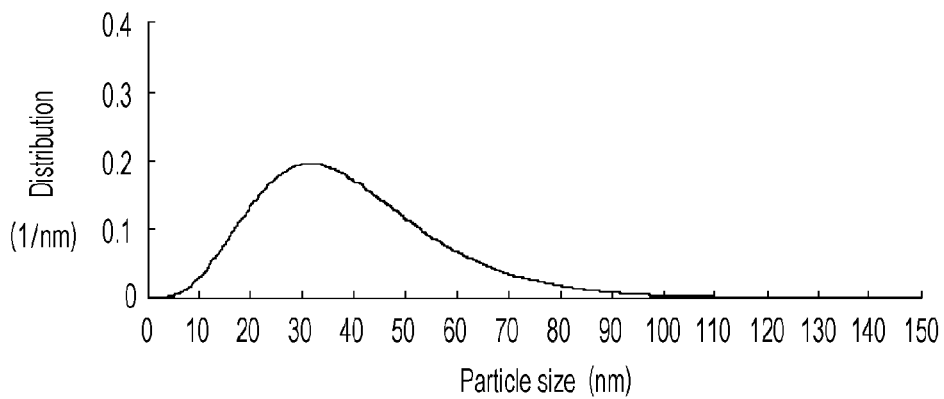
Figure 11:
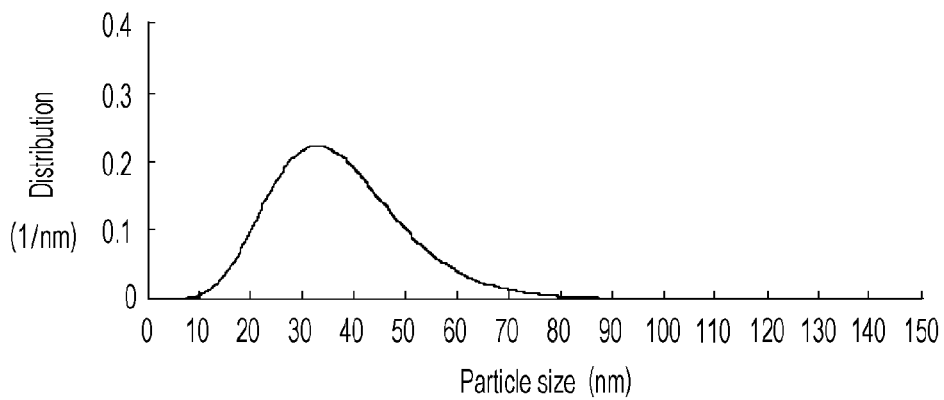

FIGS. 9 and 10 illustrate a TEM image and a SEM image of a comparative silver-nanoparticle-containing composite produced with a polymer containing no phosphate residues. FIGS. 11.1 to 11.4 illustrate particle-size distributions and changes thereof over time obtained by small-angle X-ray diffractometry; the considerable change in the particle-size distribution after drying and the extension of the particle-size distribution over time as described above were not observed. FIG. 12 illustrates an observation result by wide-angle X-ray diffractometry; the crystallite size remained unchanged and no growth was observed. A coating film formed by drying the dispersion liquid at room temperature had a mere volume resistivity of $9.2 \times 10^0$ Ωcm, which did not exhibit the capability of fusion at room temperature.

A metal-nanoparticle-containing composite and a dispersion liquid thereof according to the present invention are not particularly limited in terms of, for example, applications thereof; in particular, they are preferably used for forming conductive films on base materials and in portions that cannot be heated or warmed. In addition, depending on desired properties, combined use and mixing of, for example, organic solvents, various resins, additives, coloring compounds such as dyes, and fillers is allowed unless advantages of the present invention are degraded.

EXAMPLES

Hereinafter, the present invention will be described with reference to EXAMPLES. "Parts" and "%" are based on mass unless otherwise specified.
Evaluation Methods for Metal-Nanoparticle-Containing Composite, Dispersion Liquid, and Metal Film
[Formation of Metal Films for Evaluation]

About 0.5 mL of a dispersion liquid was dropped at a position about 1 cm away from an end of a clean slide glass having dimensions of 7.6 cm×2.6 cm, and was spread with a bar coater (No. 8) to form a thin metal film. A few droplets of the dispersion liquid were placed on thin pieces that had dimensions of 7.6 cm×2.6 cm and were composed of polyethylene naphthalate (PEN), polyethylene terephthalate (PET), and polyimide (PI) and were formed into thin metal films with the bar coater (No. 8) in the same manner as described above. The thus-formed metal films were air-dried at room temperature (25° C.) for 30 minutes or 1 day to provide room-temperature-dried metal films. In addition, metal films having been air-dried for 30 minutes were heated in a hot-air dryer at 100° C. or 150° C. to provide metal films baked at these temperatures.
[Resistivity Measurement of Metal Films]

Each of the metal films obtained above was measured in terms of thickness with a scanning laser microscope 1LM15 (manufactured by Lasertec Corporation); and was subsequently measured in terms of surface resistivity (Ω/□) with a low resistivity meter Loresta GP MCP-T610 (manufactured by Mitsubishi Chemical Corporation) in compliance with "Testing method for resistivity of conductive plastics with a four-point probe array" of JIS K7194. The volume resistivity (Ωcm) was calculated from the thickness (cm) of the metal film and the surface resistivity (Ω/□) with the following equation.

Volume resistivity (Ωcm)=Surface resistivity (Ω/□)× Thickness (cm)

[Measurements of Particle Size and Particle-Size Distribution]
TEM Observation

A droplet of the dispersion liquid having been diluted was dropped on a copper grid having a Formvar film for observation with an electron microscope; the droplet was observed with a transmission electron microscope JEM-2200FS (acceleration voltage: 200 kv, manufactured by JEOL Ltd.); and the particle size was determined from the captured micrograph: an average value was calculated from 100 randomly selected particle sizes.
SEM Observation The metal films formed on glass plates in the above-described manner were observed with a scanning electron microscope JSM-7500F (acceleration voltage: 20 kv, manufactured by JEOL Ltd.).
[Estimation of Particle-Size Distribution by Small-Angle X-Ray Scattering]
Dispersion Liquid of Metal-Nanoparticle-Containing Composite A liquid-sample holder having window members of polypropylene films and a thickness of 1 mm was charged with a dispersion liquid. The dispersion liquid was measured by the transmission method with a small-angle X-ray scattering measurement system RINT TTR2 (50 kv, 300 mA, manufactured by Rigaku Corporation). A diffuse scattering intensity in a region where the diffraction angle (2θ) was 0° to 5° was recorded. The resultant curve was made to fit for Born approximation with NANO-Solver analysis software (manufactured by Rigaku Corporation). Thus, the particle-size distribution was estimated.
[Particles in Metal Film]

In a metal film immediately after the formation thereof on a glass plate in the above-described manner and metal films left for 6 hours and 12.5 hours at room temperature, an adhesive cellophane tape was attached and sufficiently pressed with fingers to each of the metal films, and detached to separate the metal film. The metal film on the adhesive cellophane tape was measured with a small-angle X-ray scattering measurement system RINT TTR2 (50 kv, 300 mA, manufactured by Rigaku Corporation). A diffuse scattering intensity in a region where the diffraction angle (2θ) was 0° to 5° was recorded. The resultant curve was made to fit for Born approximation with NANO-Solver analysis software (manufactured by Rigaku Corporation). Thus, the particle-size distribution was estimated.

[Measurement of Crystallite Size by Wide-Angle X-Ray Diffractometry]

A dispersion liquid was applied to a sample table, dried, and then immediately measured with a RINT Ultima (40 kv, 40 mA, manufactured by Rigaku Corporation). Silicon was used as a standard material. When the intensity of diffracted X-rays was recorded with respect to the diffraction angle ($2\theta$), the crystallite size (DX) was determined with the Scherrer equation described below from the half width (b) of the resultant peak and the half width (b') of the standard material. Similarly, a dried sample was observed over time.

$$DX = K\lambda/\beta \cos\theta (K=0.9)$$

where $\beta$ (corrected half width) was defined as $\beta = (b^2 + b'^2)^{1/2}$.

[Particle-Size Measurement by Dynamic Light Scattering]

A portion of a dispersion liquid was diluted with purified water and measured with a high-concentration-type particle-size analyzer FPAR-1000 (manufactured by Otsuka Electronics Co., Ltd.) in terms of particle-size distribution and average particle size.

Thermal Analysis

[Metal Silver Content by Thermogravimetric Analysis]

The prepared dispersion in an amount of 1 mL was sampled into a glass sample vial and concentrated by heating on hot water at 35° C. to 40° C. under nitrogen flow. The resultant residue was further dried in a vacuum at 40° C. for 8 hours to provide dry solid matter; 2 to 10 mg of this dry solid matter was accurately weighed in an aluminum pan for thermogravimetric analysis. The aluminum pan was placed on a differential thermogravimetric analyzer EXTAR TG/DTA6300 (manufactured by Seiko Instruments Inc.); and weight decrease percentage due to heating was measured while the temperature was increased from room temperature to 500° C. at a rate of 10° C./min under air flow. The metal content was calculated with the following equation.

Metal content (%)=100−Weight decrease percentage (%)

[Differential Scanning Calorimetry]

About 10 mg of dry solid matter similarly obtained in the above-described manner was accurately weighed in an aluminum sample pan for calorimetry; and analyzed with a differential scanning calorimeter EXTAR DSC7200 (manufactured by SII NanoTechnology Inc.) in terms of exothermic and endothermic changes while being heated from −20° C. to a set temperature at a rate of 10° C./min under nitrogen flow.

[Sectional Observation with SEM]

From a film sample having a thin metal film, a small piece having dimensions of about 0.3 cm×1 cm was cut out. The small piece was embedded in a visible-light-curable resin (D-800 manufactured by JEOL Ltd.) and curing was subsequently caused by light irradiation in two directions each for 30 seconds at room temperature with a visible-light-irradiation system (LUX-SPOT LS-800, manufactured by ICI Japan Ltd.). Thus, an embedded sample was prepared. This embedded sample was cut in a direction so as to provide a section containing the film sample with an ultramicrotome (Ultracut S manufactured by Leica Microsystems) equipped with a diamond knife for trimming (cryotrim 45° manufactured by Diatome AG). Thus, an observation sample was prepared.

Example 1

Synthesis of (meth)Acrylic-Based Polymer (B3-1) Including Methoxycarbonylethylthio Group, Phosphate Residue, and Polyethylene Glycol Chain A four-neck flask equipped with a thermometer, a stirrer, and a reflux condenser was charged with 32 parts of methyl ethyl ketone (hereafter, MEK) and 32 parts of ethanol. The resultant solution was heated to 80° C. while being stirred under nitrogen flow. Subsequently, a mixture composed of 20 parts of phosphooxyethyl methacrylate (LIGHT ESTER P-1M from Kyoeisha Chemical Co., Ltd.), 80 parts of methoxy polyethylene glycol methacrylate (molecular weight: 1,000; BLEMMER [registered trademark] PME-1000 from NOF CORPORATION), 4.1 parts of methyl mercaptopropionate, and 80 parts of MEK and a mixture composed of 0.5 parts of a polymerization initiator "2,2'-azobis(2,4-dimethylvaleronitrile) [V-65, a product of Wako Pure Chemical Industries, Ltd.] and 5 parts of MEK were each dropped over two hours. After the dropping was completed, 0.3 parts of "NOF PERBUTYL (registered trademark) O" [manufactured by NOF CORPORATION] was added twice at intervals of 4 hours and the resultant solution was stirred at 80° C. for 12 hours. The resultant resin solution was mixed with water to cause phase-inversion emulsification, depressurized to evaporate the solvent, and subsequently mixed with water so that the concentration was adjusted. Thus, an aqueous solution of a (meth)acrylic-based polymer (B3-1) having a nonvolatile content of 76.8% was prepared. The weight-average molecular weight of the resin measured by gel permeation chromatography in terms of polystyrene was 4,300; and the acid value was 97.5 mgKOH/g.

[Production of Dispersion Liquid of Silver-Nanoparticle-Containing Composite]

A reducing-agent solution was prepared that contained 463 g (4.41 mol) of 85% N,N-diethylhydroxylamine, the (meth)acrylic-based polymer (B3-1) (23.0 g in terms of nonvolatile matter) prepared above, and 1250 g of water. Separately, the (meth)acrylic-based polymer (B3-1) (11.5 g in terms of nonvolatile matter) was dissolved in 333 g of water; the resultant solution was mixed with a solution prepared by dissolving 500 g (2.94 mol) of silver nitrate in 833 g of water; and the resultant solution was sufficiently stirred. The above-described reducing-agent solution was dropped into the resultant mixture at room temperature (25° C.) over 2 hours. The resultant reaction mixture was filtered through a membrane filter (pore size: 0.45 micrometers); the filtrate was circulated through a hollow-fiber ultrafiltration module (MOLSEP module FB-02, manufactured by Daicen Membrane Systems Ltd., molecular weight cut-off: 150,000) to be purified while water was added in an amount corresponding to the outflow amount of the filtrate as needed. After the filtrate was confirmed to have a conductivity of 100 µS/cm or less, the addition of water was finished and the filtrate was concentrated. The concentrated matter was collected and a dispersion liquid of a silver-nanoparticle-containing composite (the dispersion medium was water) having a nonvolatile content of 36.7% was obtained (742.9 g). The average particle size of the composite was estimated to be 39 nm by dynamic light scattering and 10 to 40 nm from a TEM image (FIG. 1).

The silver content of the nonvolatile matter was measured by thermogravimetric analysis and it was found to be 94.8 w/w % (yield: 81%). The obtained dispersion was sampled onto a slide glass and formed into a thin metal film with a bar coater. Immediately after the thin metal film was dried, the volume resistivity thereof was measured and it was found to be $1.1 \times 10^{-5}$ Ωcm. After the film was left at room temperature for 7 days, the measurement indicates that it was $4.1 \times 10^{-6}$ Ωcm.

Figure 2:
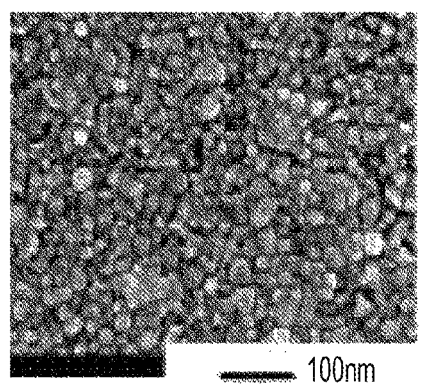
FIG. 2 is a SEM micrograph of a film formed by applying a dispersion liquid of a metal-nanoparticle-containing composite prepared in EXAMPLE 1 onto a glass plate and drying the dispersion liquid at room temperature.
Figure 4:
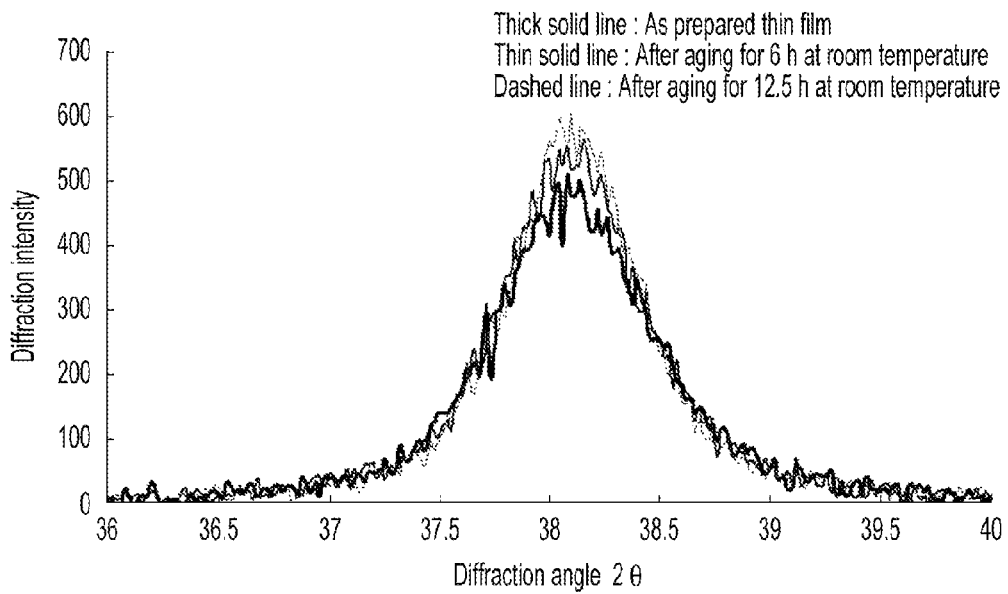
FIG. 4.1 illustrates the results of observation of crystallite size over time in a metal film obtained in EXAMPLE 1, the crystallite size being determined by wide-angle X-ray diffractometry.

FIG. 2 illustrates a SEM image of a film immediately after the film was formed. FIG. 3.2 illustrates the particle-size distribution of the silver nanoparticles in the film immediately after the film was formed, the distribution being determined by small-angle X-ray diffractometry. FIGS. 3.3 and 3.4 respectively illustrate particle-size distributions after 6 hours and 12.5 hours elapsed. FIG. 3.1 illustrates the particle-size distribution of the silver nanoparticles in the state of a solution, the distribution being determined by small-angle X-ray diffractometry. FIG. 4 illustrates the measurement of the dry solid matter of the composite obtained above, in terms of crystallite size over time by wide-angle X-ray diffractometry. This measurement indicated an increase in the crystallite size over time.

FIG. 5 illustrates a chart of differential scanning calorimetry. Even in the first scan, an endothermic peak is observed in a low-temperature range of 10° C. to 30° C.; this is probably derived from the (meth)acrylic-based polymer (B3-1) serving as a protective agent. This probably corresponds to Tg of the (meth)acrylic-based polymer (B3-1) having become separated from the silver nanoparticles. Such a phenomenon that a protective agent becomes separated at room temperature has never been reported. In the scanning range up to 200° C., no rapid exothermic peaks corresponding to the fusion of the silver nanoparticles were observed; only a broad exothermic change starting at about 70° C. was observed.

FIG. 6 illustrates analysis charts in which the upper-limit temperature of the first temperature increase was changed to 100° C., 150° C., and 180° C. From the charts, the peaks that appeared in the second scan and were derived from the (meth) acrylic-based polymer (B3-1) gradually become large with an increase in the first upper-limit temperature and converge to the peak at about 30° C.

[Evaluation of Storage Stability of Dispersion Liquid Obtained in Example 1]

About 100 mL of the dispersion liquid obtained in EXAMPLE 1 was poured into a polyethylene vessel (100 mL) equipped with a screw cap and left at rest in a cooling box at 3° C. to 7° C. After one day elapsed, the vessel was taken out from the cooling box without being vibrated; and about 2 mL of the dispersion liquid was carefully extracted from a position near the liquid surface with a polyethylene pipet. About 500 mg of the extracted liquid was accurately weighed into a 5-mL glass sample vial, concentrated by drying and solidification on a water bath at about 40° C. and with nitrogen flow, and further dried at a reduced pressure in a vacuum dryer at 40° C. to 50° C. for 8 hours. The nonvolatile content was calculated with the following equation.

Nonvolatile content (%)=Amount of concentrated dry solid from dispersion liquid (mg)/Amount of extracted dispersion liquid (mg)×100

A portion of the extracted sample was applied to a slide glass with a bar coater, dried, and then measured in terms of volume resistivity. A small amount of the sample was diluted with water and measured in terms of a particle-size distribution by light scattering. The remaining dispersion liquid was carefully returned to the cooling box. Samples were similarly extracted after 7, 14, 21, 28, 60, 90, 120, 150, and 180 days elapsed and measured in terms of nonvolatile content. The results are described in a table below. The nonvolatile content in the top surface of the dispersion liquid, the volume resistivity of a coating film, and the average particle size were substantially constant.

TABLE 1

| Elapsed days (days) | Nonvolatile content (%) | Volume resistivity of coating film (Ωcm) | Average particle size (nm) |
|---|---|---|---|
| 0 | 36.7 | $1.10 \times 10^{-5}$ | 39 |
| 1 | 35.8 | $1.50 \times 10^{-5}$ | — |
| 7 | 34.2 | $1.20 \times 10^{-5}$ | — |
| 14 | 34.8 | $1.20 \times 10^{-5}$ | — |
| 21 | 34.8 | $1.30 \times 10^{-5}$ | — |
| 28 | 33.9 | $1.40 \times 10^{-5}$ | — |
| 60 | 33.7 | $1.20 \times 10^{-5}$ | — |
| 90 | 33.0 | $1.20 \times 10^{-5}$ | 38 |
| 120 | 31.2 | $1.13 \times 10^{-5}$ | — |
| 150 | 30.1 | $1.16 \times 10^{-5}$ | — |
| 180 | 29.3 | $1.21 \times 10^{-5}$ | — |

Example 2

Synthesis of (Meth)Acrylic-Based Polymer (B3-2) Including 2-(2-ethylhexyloxycarbonyl)ethylthio Group and Phosphate Residue Operations were performed as in EXAMPLE 1 except that 4.1 parts of methyl mercaptopropionate in EXAMPLE 1 was replaced by 11.2 parts of 2-ethylhexyl mercaptopropionate to provide an aqueous solution of a (meth)acrylic-based polymer (B3-2) having a nonvolatile content of 73.2%. The polymer had a weight-average molecular weight of 4,100 and an acid value of 98.1 mgKOH/g.

[Production of Dispersion Liquid of Silver-Nanoparticle-Containing Composite]

A reducing-agent solution was prepared that contained 5.56 g (53.0 mmol) of 85% N,N-diethylhydroxylamine, the (meth)acrylic-based polymer (B3-2) (106 mg in terms of nonvolatile matter) prepared above, and 15 g of water. Separately, the (meth)acrylic-based polymer (B3-2) (106 mg in terms of nonvolatile matter) was dissolved in 5 g of water; the resultant solution was mixed with a solution prepared by dissolving 6.00 g (35.3 mmol) of silver nitrate in 10 g of water; and the resultant solution was sufficiently stirred. The above-described reducing-agent solution was dropped into the resultant mixture at room temperature (25° C.) over 2 hours. The resultant reaction mixture was filtered through a membrane filter (pore size: 0.45 micrometers); the filtrate was circulated through a hollow-fiber ultrafiltration module (MOLSEP module HIT-1, manufactured by Daicen Membrane Systems Ltd., molecular weight cut-off: 150,000) to be purified while water was added in an amount corresponding to the outflow amount of the filtrate as needed. After the filtrate was confirmed to have a conductivity of 100 μS/cm or less, the addition of water was finished and the filtrate was concentrated. The concentrated matter was collected and a dispersion liquid of a silver-nanoparticle-containing composite having a nonvolatile content of about 30% was obtained. The dispersion liquid was applied to a slide glass with a bar coater (No. 8) and dried at room temperature. Immediately after the film was dried, the volume resistivity thereof was found to be $4.1 \times 10^{-5}$ Ωcm.

Example 3

Production of (Meth)Acrylic-Based Polymer (B3-3) Including 2,3-dihydroxypropylthio Group and Phosphate Residue, and Dispersion Liquid of Silver-Nanoparticle-Containing Composite from (Meth) Acrylic-Based Polymer (B3-3)

Operations were performed as in EXAMPLE 2 except that 11.2 parts of 2-ethylhexyl mercaptopropionate in EXAMPLE 2 was replaced by 4.1 parts of thioglycerin to provide an aqueous solution of a (meth)acrylic-based polymer (B3-3) having a nonvolatile content of 70.1%. The polymer had a weight-average molecular weight of 5,500 and an acid value of 95.1 mgKOH/g. The thus-prepared (meth)acrylic-based polymer (B3-3) was used to prepare a dispersion liquid of a silver-nanoparticle-containing composite as in EXAMPLE 2. Immediately after a film formed from the dispersion liquid was dried, the volume resistivity of the film was measured and found to be $8.9 \times 10^{-5}$ Ωcm.

Example 4

Production of (Meth)Acrylic-Based Polymer (B3-4) Including 2-hydroxyethylthio Group and Phosphate Residue, and Dispersion Liquid of Silver-Nanoparticle-Containing Composite from (Meth)Acrylic-Based Polymer (B3-4)

Operations were performed as in EXAMPLE 2 except that 11.2 parts of 2-ethylhexyl mercaptopropionate in EXAMPLE 2 was replaced by 2 parts of thioglycol to provide an aqueous solution of a (meth)acrylic-based polymer (B3-4) having a nonvolatile content of 56.4%. The weight-average molecular weight was 6,700 and the acid value was 94.9 mgKOH/g. The thus-prepared (meth)acrylic-based polymer (B3-4) was used to prepare a dispersion liquid of a silver-nanoparticle-containing composite as in EXAMPLE 2. Immediately after a film formed from the dispersion liquid was dried, the volume resistivity of the film was measured and found to be $6.2 \times 10^{-5}$ Ωcm.

Example 5

Production of (Meth)Acrylic-Based Polymer (B3-5) Including Carboxymethylthio Group and Phosphate Residue, and Dispersion Liquid of Silver-Nanoparticle-Containing Composite from (Meth)Acrylic-Based Polymer (B3-5)

Operations were performed as in EXAMPLE 2 except that 11.2 parts of 2-ethylhexyl mercaptopropionate in EXAMPLE 2 was replaced by 2 parts of thioglycolic acid to provide an aqueous solution of a (meth)acrylic-based polymer (B3-5) having a nonvolatile content of 65.1%. The weight-average molecular weight was 6,800 and the acid value was 92.1 mgKOH/g. The thus-prepared (meth)acrylic-based polymer (B3-5) was used to prepare a dispersion liquid of a silver-nanoparticle-containing composite as in EXAMPLE 2. Immediately after a film formed from the dispersion liquid was dried, the volume resistivity of the film was measured and found to be $1.4 \times 10^{-5}$ Ωcm.

Example 6

Production of (Meth)Acrylic-Based Polymer (B3-6) Including Dodecylthio Group and Phosphate Residue, and Dispersion Liquid of Silver-Nanoparticle-Containing Composite from (Meth)Acrylic-Based Polymer (B3-6)

Operations were performed as in EXAMPLE 2 except that 11.2 parts of 2-ethylhexyl mercaptopropionate in EXAMPLE 2 was replaced by 6 parts of dodecyl mercaptan to provide an aqueous solution of a (meth)acrylic-based polymer (B3-6) having a nonvolatile content of 77.7%. The weight-average molecular weight was 9,600 and the acid value was 97.0 mgKOH/g. The thus-prepared (meth)acrylic-based polymer (B3-6) was used to prepare a dispersion liquid of a silver-nanoparticle-containing composite as in EXAMPLE 2. Immediately after a film formed from the dispersion liquid was dried, the volume resistivity of the film was measured and found to be $9.0 \times 10^{-5}$ Ωcm.

Example 7

Production of Copper-Nanoparticle-Containing Composite

The (meth)acrylic-based polymer (B3-1) (2.00 g in terms of solid matter) obtained in EXAMPLE 1 was dissolved in 40 mL of water and mixed with a solution prepared by dissolving 10.0 g (50.09 mmol) of copper acetate hydrate in 500 mL of water. An 80% aqueous solution of hydrazine (10 g, about 160 mmol) was dropped into the resultant solution over about 2 hours so that bubbling mildly occurred. The resultant solution was stirred at room temperature for an hour until the bubbling finished. Thus, a reddish-brown solution was obtained.

This solution was passed through an ultrafiltration module (single module, manufactured by Daicen Membrane Systems Ltd., molecular weight cut-off: 150,000) and purified by passing purified water having been deaerated by nitrogen bubbling until about 1 L of effluent was discharged from the ultrafiltration unit. The feeding of the deaerated water was stopped and concentration was performed to provide 15 g of a dispersion liquid (solid content: about 20 w/w %). A droplet of this dispersion liquid was dissolved in ethanol (50 mL) and measured in terms of ultraviolet-visible absorption spectrum. As a result, an absorption derived from plasmon resonance was observed at about 600 nm and generation of copper nanoparticles was confirmed. The dispersion liquid was applied to a glass plate with a bar coater in a nitrogen atmosphere and then dried at room temperature under nitrogen flow. Thus, a copper-colored coating film having a metallic luster was obtained.

Example 8

Production of Gold-Nanoparticle-Containing Composite

The (meth)acrylic-based polymer (B3-1) (0.102 g in terms of solid matter) obtained in EXAMPLE 1 was dissolved in 5 mL of water and mixed with a solution prepared by dissolving 1.00 g (2.54 mmol) of tetrachloroauric acid trihydrate in 5 mL of water. The resultant solution was mixed with 5 mL of an aqueous solution of 1.81 g (20.31 mmol) of dimethylaminoethanol and the resultant solution was stirred at room temperature for 2 hours. Thus, a dark-red solution was obtained. This solution was divided and fed to ultrafiltration units (two units, Vivaspin 20 from Sartorius Stedim Biotech, molecular weight cut-off: 50,000) and filtered by centrifugal force (5800 G). A process of adding purified water to the filtration residue and subjecting the resultant solution to centrifugal filtration was repeated four times; and the resultant residue was mixed with water to provide 4.0 g of an aqueous dispersion liquid (solid content: about 12 w/w %). A droplet of this dispersion liquid was dissolved in ethanol (50 mL) and measured in terms of ultraviolet-visible absorption spectrum. As a result, an absorption derived from plasmon resonance was observed at about 530 nm and generation of gold nanoparticles was confirmed. The dispersion liquid was applied to glass and dried at room temperature. Thus, a gold-colored film having a metallic luster was obtained.

Example 9

Reduction with Triethanolamine

The (meth)acrylic-based polymer (B3-1) (0.106 g in terms of solid matter) obtained in EXAMPLE 1 was dissolved in 12 mL of water, mixed with 12 mL of 1 mol/L nitric acid, and subsequently mixed with a solution prepared by dissolving 6.00 g (35.3 mmol) of silver nitrate in 24 mL of water and 13.2 g (88.3 mmol) of triethanolamine. The resultant solution was stirred at 60° C. for 2 hours to provide a turbid brown solution. After this solution was cooled, it was passed through an ultrafiltration module (single module, MOLSEP module HIT-1, manufactured by Daicen Membrane Systems Ltd., molecular weight cut-off: 150,000) and purified by passing purified water until about 1 L of effluent was discharged from the ultrafiltration unit. The feeding of the purified water was stopped and concentration was performed to provide 12.5 g of a dispersion liquid (solid content: 30 w/w %). A dried coating film formed from this dispersion liquid was measured in terms of volume resistivity and it was found to be $9.9 \times 10^{-5}$ Ωcm.

Example 10

Reduction with 2-dimethylaminoethanol

The (meth)acrylic-based polymer (B3-1) (0.106 g in terms of solid matter) obtained in EXAMPLE 1 was dissolved in 12 mL of water, mixed with 12 mL of 1 mol/L nitric acid, and subsequently mixed with a solution prepared by dissolving 6.00 g (35.3 mmol) of silver nitrate in 24 mL of water. A solution prepared by dissolving 7.87 g (88.3 mmol) of 2-dimethylaminoethanol in 15 mL of water was slowly dropped at room temperature into the resultant solution. After the dropping was completed, the resultant solution was stirred for three days at room temperature to provide a turbid brown solution. This solution was passed through an ultrafiltration module (single module, MOLSEP module HIT-1, manufactured by Daicen Membrane Systems Ltd., molecular weight cut-off: 150,000) and purified by passing purified water until about 1 L of effluent was discharged from the ultrafiltration unit. The feeding of the purified water was stopped and concentration was performed to provide 12.5 g of a dispersion liquid (solid content: 30 w/w %). A dried coating film formed from this dispersion liquid was measured in terms of volume resistivity and it was found to be $2.8 \times 10^{-5}$ Ωcm.

Example 11

Solvent Exchange 1 to Ethanol

A reducing-agent solution was prepared that contained 5.56 g (53.0 mmol) of 85% N,N-diethylhydroxylamine, the (meth)acrylic-based copolymer (B3-1) (106 mg in terms of nonvolatile matter) obtained in EXAMPLE 1, and 15 g of water. Separately, the (meth)acrylic-based polymer (B3-1) (106 mg in terms of nonvolatile matter) was dissolved in 5 g of water; the resultant solution was mixed with a solution prepared by dissolving 6.00 g (35.3 mmol) of silver nitrate in 10 g of water; and the resultant solution was sufficiently stirred. The above-described reducing-agent solution was dropped into the resultant mixture under ice cooling over 2 hours. The resultant reaction mixture was circulated through a hollow-fiber ultrafiltration module (MOLSEP module HIT-1, manufactured by Daicen Membrane Systems Ltd., molecular weight cut-off: 150,000) to be purified while water was added in an amount corresponding to the outflow amount of the filtrate as needed. After the filtrate was confirmed to have a conductivity of 100 µS/cm or less, the addition of water was finished and the filtrate was concentrated such that the concentrate had an amount of about 10 mL. While ethanol was added to the ultrafiltration system, solvent exchange was performed by adding ethanol in an amount corresponding to the outflow amount of the filtrate as needed. After 100 mL of an ethanol filtrate was discharged, it was concentrated to provide an ethanol dispersion liquid of a silver-nanoparticle-containing composite having a nonvolatile content of about 60%. The dispersion liquid was applied to a slide glass with a bar coater (No. 8) and dried at room temperature. The volume resistivity of the dried coating film was found to be $9.8 \times 10^{-5}$ Ωcm.

Example 12

Solvent Exchange 2 to Ethanol

The dispersion liquid (100 g) obtained in EXAMPLE 1 was again circulated through a hollow-fiber ultrafiltration module (MOLSEP module HIT-1-FUS-1582, manufactured by Daicen Membrane Systems Ltd., molecular weight cut-off: 150,000) while solvent exchange was performed by adding ethanol in an amount corresponding to the outflow amount of the filtrate as needed. This process was continued until addition of hexane to a portion of the outflow solution did not cause turbidity; and about 200 mL was further discharged. The ethanol dispersion liquid was collected to provide an ethanol dispersion liquid (121 g) of a silver-nanoparticle-containing composite having a nonvolatile content of 30.4%. The average particle size of the composite measured by dynamic light scattering was found to be 55 nm. A TEM image did not change from that prior to the solvent exchange and the particle size was estimated to be 10 to 40 nm. A small amount of the dispersion liquid was placed on a slide glass, spread with a No. 8 bar coater, and then dried at room temperature. The volume resistivity of the dried coating film was found to be $2.2 \times 10^{-5}$ Ωcm.

Example 13

Solvent Exchange to 2-Propanol

The process was performed as in EXAMPLE 12 except that about 15 g of the dispersion liquid obtained in EXAMPLE 1 was used and the solvent used for the exchange was 2-propanol. Thus, a 2-propanol dispersion liquid of a silver-nanoparticle-containing composite having a nonvolatile content of 23.3% was obtained. A small amount of the dispersion liquid was placed on a slide glass, spread with a No. 8 bar coater, and then dried at room temperature. The volume resistivity of the dried coating film was found to be $5.3 \times 10^{-5}$ Ωcm.

Example 14

Solvent Exchange from Ethanol to Toluene

The ethanol dispersion liquid (20 g) obtained in EXAMPLE 12 was placed into a 200-mL flask for concentration; 50 mL of toluene was added thereto; and the resultant solution was concentrated under a reduced pressure with an evaporator in which the temperature of the water bath was set at 40° C. When the amount of the solution became about 20 mL, 50 mL of toluene was added again and the resultant solution was concentrated under a reduced pressure. This process was conducted once again to provide a toluene dispersion liquid of a silver-nanoparticle-containing composite having a nonvolatile content of 20.0%. A small amount of the dispersion liquid was placed on a slide glass, spread with a No. 8 bar coater, and then dried at room temperature. The volume resistivity of the dried coating film was found to be $7.6 \times 10^{-5}$ Ωcm.

Example 15

Synthesis of (Meth)Acrylic-Based Polymer (B1-1) Including Carboxymethylthio Group and Polyethylene Glycol Chain A four-neck flask equipped with a thermometer, a stirrer, and a reflux condenser was charged with 64 parts of MEK. This solution was heated to 80° C. while being stirred under nitrogen flow. Subsequently, a mixture composed of 80 parts of methoxy polyethylene glycol methacrylate (PME-1000), 4.1 parts of mercaptoacetate, and 80 parts of MEK and a mixture composed of 0.5 parts of a polymerization initiator V-65 and 5 parts of MEK were each dropped over two hours. After the dropping was completed, 0.3 parts of "PERBUTYL O " was added twice at intervals of 4 hours and the resultant solution was stirred at 80° C. for 12 hours. The resultant resin solution was mixed with water to cause phase-inversion emulsification, depressurized to evaporate the solvent, and subsequently mixed with water so that the concentration was adjusted. Thus, an aqueous solution of a (meth)acrylic-based polymer (B1-1) having a nonvolatile content of 54.9% was prepared. The weight-average molecular weight of the resin measured by gel permeation chromatography in terms of polystyrene was 7,500.

[Synthesis of (Meth)Acrylic-Based Polymer (B2-1) Including Carboxyethylthio Group and Phosphate Residue]

A four-neck flask equipped with a thermometer, a stirrer, and a reflux condenser was charged with 32 parts of water and 32 parts of 2-propanol. The resultant solution was heated to 80° C. while being stirred under nitrogen flow. A mixture composed of 20 parts of phosphooxyethyl methacrylate (P-1M), 4 parts of mercaptopropionic acid, and 50 parts of water and a mixture composed of 0.5 parts of a polymerization initiator V-65 and 5 parts of 2-propanol were each dropped over two hours. A mixture composed of 0.3 parts of the polymerization initiator V-65 and 3 parts of 2-propanol was added twice at intervals of 4 hours and the resultant solution was stirred at 80° C. for 8 hours. Water and 2-propanol were evaporated under a reduced pressure and the concentration was adjusted with 2-propanol to provide a (meth)acrylic-based polymer (B2-1) including a phosphate residue and having a nonvolatile content of 45.2%. The weight-average molecular weight measured by gel permeation chromatography in terms of polystyrene was 3,500; and the acid value was 431 mgKOH/g.

[Production of Dispersion Liquid of Silver-Nanoparticle-Containing Composite]

A reducing-agent solution was prepared that contained 463 g (4.41 mol) of 85% N,N-diethylhydroxylamine, the (meth)acrylic-based polymer (B1-1) (18.4 g in terms of nonvolatile matter) prepared above, the (meth)acrylic-based polymer (B2-1) (4.6 g in terms of nonvolatile matter), and 1250 g of water. Separately, the (meth)acrylic-based polymer (B1-1) (9.2 g in terms of nonvolatile matter) and the (meth)acrylic-based polymer (B2-1) (2.3 g in terms of nonvolatile matter) were dissolved in 333 g of water; the resultant solution was mixed with a solution prepared by dissolving 500 g (2.94 mol) of silver nitrate in 833 g of water; and the resultant solution was sufficiently stirred. The above-described reducing-agent solution was dropped into the resultant mixture at room temperature (25° C.) over 2 hours. The resultant reaction mixture was filtered through a membrane filter (pore size: 0.45 micrometers); the filtrate was circulated through a hollow-fiber ultrafiltration module (MOLSEP module FB-02, manufactured by Daicen Membrane Systems Ltd., molecular weight cut-off: 150,000) to be purified while water was added in an amount corresponding to the outflow amount of the filtrate as needed. After the filtrate was confirmed to have a conductivity of 100 µS/cm or less, the addition of water was finished and the filtrate was concentrated. The concentrated matter was collected and a dispersion liquid of a silver-nanoparticle-containing composite having a nonvolatile content of 48.3% was obtained (561.7 g). The average particle size of the composite was estimated to be 49 nm by dynamic light scattering and 10 to 40 nm from a TEM image. The silver content of the nonvolatile matter was measured by thermogravimetric analysis and it was found to be 94.2 w/w %.

[Evaluation of Storage Stability of Dispersion Liquid obtained in Example 15]

About 100 mL of the dispersion liquid obtained in EXAMPLE 15 was poured into a polyethylene vessel (100 mL) equipped with a screw cap and left at rest in a cooling box at 3° C. to 7° C. This was evaluated in terms of storage stability as in EXAMPLE 1. The results are described in Table 2.

TABLE 2

| Elapsed days (days) | Nonvolatile content (%) | Volume resistivity of coating film (Ωcm) |
|---|---|---|
| 0 | 48.3 | $1.14 \times 10^{-5}$ |
| 30 | 46.4 | $1.01 \times 10^{-5}$ |
| 60 | 43.7 | $1.28 \times 10^{-5}$ |
| 90 | 38.4 | $1.46 \times 10^{-5}$ |
| 120 | 34.3 | $1.50 \times 10^{-5}$ |
| 150 | 31.9 | $1.49 \times 10^{-5}$ |
| 180 | 30.9 | $1.50 \times 10^{-5}$ |

Example 16

Solvent Exchange 2 to Ethanol

The medium was exchanged to ethanol as in EXAMPLE 12 except that the aqueous dispersion liquid (100 g) obtained in EXAMPLE 15 was used. The resultant ethanol dispersion liquid had a nonvolatile content of 26.5% (152 g). The average particle size of the composite measured by dynamic light scattering was found to be 47 nm. The TEM image did not change from that prior to the solvent exchange and the particle size was estimated to be 10 to 40 nm. A small amount of the dispersion liquid was placed on a slide glass, spread with a No. 8 bar coater, and then dried at room temperature. The volume resistivity of the dried coating film was found to be $7.2 \times 10^{-5}$ Ωcm.

Example 17

Preparation of High-Concentration Product

The dispersion liquid (558 g) obtained in EXAMPLE 1 was further circulated through a hollow-fiber ultrafiltration module (MOLSEP module HIT-1-FUS-1582, manufactured by Daicen Membrane Systems Ltd., molecular weight cut-off: 150,000) to be concentrated. The concentrated matter was collected to provide a dispersion liquid (236 g) of a silver-nanoparticle-containing composite having a nonvolatile content of 73.6%. The average particle size of the composite measured by dynamic light scattering was found to be 43 nm. The TEM image did not change from that prior to the concentration and the particle size was estimated to be 10 to 40 nm. The silver content of the nonvolatile matter was measured by thermogravimetric analysis and it was found to be 94.1 w/w %.

[Evaluation of Storage Stability of High-Concentration Dispersion Liquid]

About 100 mL of the high-concentration dispersion liquid obtained in EXAMPLE 17 was subjected to the storage-stability test as in EXAMPLE 1. The results are described in Table 3.

TABLE 3

| Elapsed days (days) | Nonvolatile content (%) | Volume resistivity of coating film ($\Omega$cm) |
|---|---|---|
| 0 | 73.6 | $0.93 \times 10^{-5}$ |
| 30 | 72.0 | $0.73 \times 10^{-5}$ |
| 60 | 72.1 | $0.78 \times 10^{-5}$ |
| 90 | 69.8 | $0.83 \times 10^{-5}$ |
| 120 | 62.3 | $0.84 \times 10^{-5}$ |
| 150 | 62.0 | $0.84 \times 10^{-5}$ |
| 180 | 61.5 | $0.84 \times 10^{-5}$ |

Example 18

Production of Plastic Substrate

Figure 7:
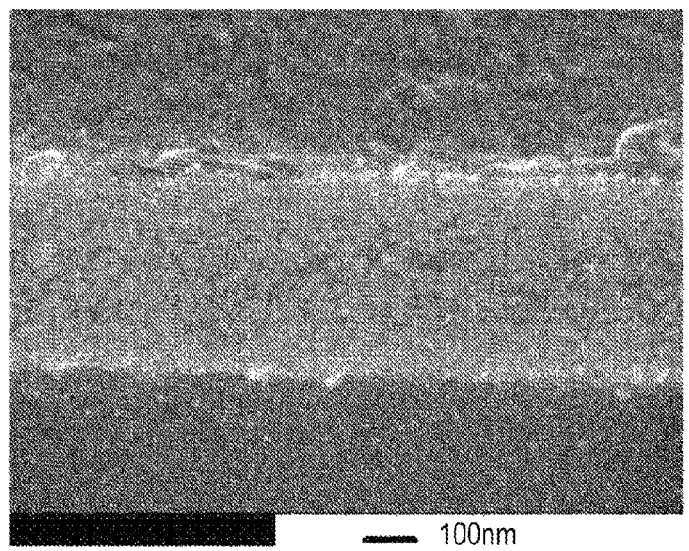
FIG. 7 illustrates a SEM micrograph of a section of a thin film on a PET film, the SEM micrograph being captured in EXAMPLE 18.

The dispersion liquid obtained in EXAMPLE 1 was placed on a polyimide (PI) film (Kapton 200V, manufactured by DU PONT-TORAY CO., LTD., 200 μm), a polyethylene naphthalate (PEN) film (Teonex Q-65FA, manufactured by Teijin DuPont Films Japan Limited, 100 μm), and a polyethylene terephthalate (PET) film (TOYOBO ESTER FILM E5101, manufactured by TOYOBO CO., LTD., 50 μm) that were formed to have dimensions of 7.6 cm×22.6 cm, spread with a No. 8 bar coater, dried, and evaluated in terms of surface resistivity (immediately after drying (about 30 minutes elapsed after film formation) and after 7 days elapsed). A section of such a film was observed with a scanning electron microscope (SEM) to determine the film thickness (FIG. 7). Adhesion evaluation was performed by peeling with a tape in compliance with a peeling test method (JIS H8504, Methods of adhesion test for metallic coatings). As a result, it was demonstrated that adhesion was maintained at a practically adequate level in the coating film on PI and the coating film on PEN after 7 days elapsed.

TABLE 4

| | | Plastic film | | |
|---|---|---|---|---|
| | Bar coater | PI | PEN | PET |
| Surface resistivity ($\Omega$/□) | Immediately after film formation | 0.64 | 0.42 | 1.3 |
| | After 7 days | 0.60 | 0.29 | 1.1 |
| Volume resistivity (μ$\Omega$cm) | After 7 days | 19 | 9.6 | 41 |
| Film thickness (μm) | | 0.31 | 0.33 | 0.37 |

Example 19

Production of Plastic Substrate by Coating with Gravure Coater

Figure 8:
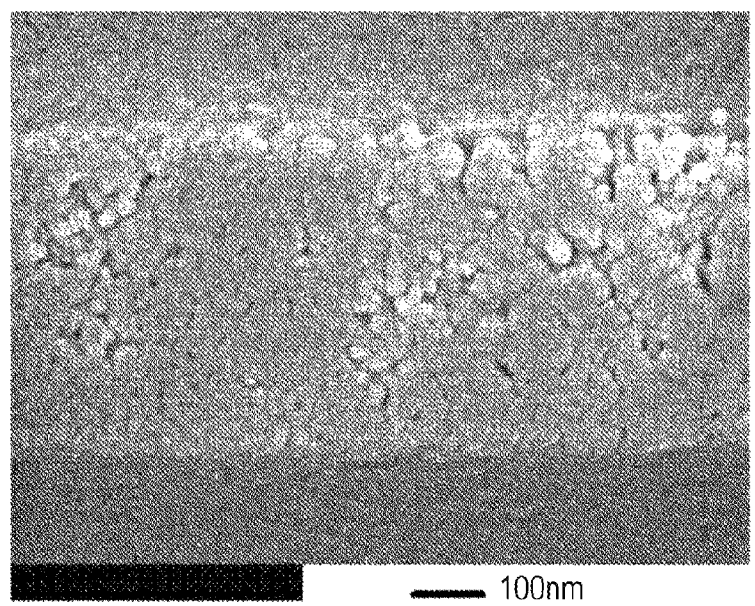
FIG. 8 illustrates a SEM micrograph of a section of a thin film on a PET film, the SEM micrograph being captured in EXAMPLE 19.

A coating solution of the dispersion liquid obtained in EXAMPLE 1 was prepared with 2-propanol in an amount corresponding to 20 wt % of the dispersion liquid and polyvinyl alcohol (Wako Pure Chemical Industries, Ltd., degree of polymerization: about 500) in an amount corresponding to 1.4 wt % of the solid content of the dispersion liquid. This coating solution was applied to a PET roll film (TOYOBO ESTER FILM E5101 manufactured by TOYOBO CO., LTD., 50 μm, width: 40 cm) with a small-diameter gravure coater (Multicoater M200-L, manufactured by HIRANO TEC-SEED Co., Ltd.; coating rate: 0.5 m/min; drying length: 4.5 m; drying temperature: 85° C.); and evaluation was performed as in EXAMPLE 18. Even in the coating film after 7 days elapsed, the adhesion was perfectly maintained. After this coating film was immersed in hot water at 40° C. for 4 hours, it was confirmed that adhesion was achieved at a practically adequate level (FIG. 8).

TABLE 5

| | Gravure coater | PET |
|---|---|---|
| Surface resistivity ($\Omega$/□) | Immediately after film formation | 1.0 |
| | After 7 days | 0.96 |
| Volume resistivity (μ$\Omega$cm) | After 7 days | 50 |
| Film thickness (μm) | | 0.52 |

Comparative Example 1

Synthesis of Comparative (Meth)Acrylic-Based Polymer (B'-1) Including Hydroxyethylthio Group and Dimethylaminoethyl Group, and Production of Dispersion Liquid of Silver-Nanoparticle-Containing Composite from (Meth)Acrylic-Based Polymer (B'-1)

A mixture of 10 parts of dimethylaminoethyl methacrylate, 9 parts of 4-hydroxybutyl acrylate, 81 parts of methoxypolyethylene glycol methacrylate (molecular weight: 1000), 2 parts of thioglycol, 80 parts of MEK, and 4 parts of a polymerization initiator ("PERBUTYL O " was dropped over two hours into 70 parts of MEK that was maintained at 80° C. under nitrogen flow and was being stirred. After the dropping was finished, 2 parts of "PERBUTYL O " was added and the resultant solution was stirred at 80° C. for 22 hours. The resultant reaction mixture was mixed with water, depressurized to evaporate the solvent, and subsequently mixed with water so that the concentration was adjusted. In this manner, an aqueous solution of a comparative (meth)acrylic-based polymer (B'-1) having a nonvolatile content of 44.1% was prepared. The weight-average molecular weight of the resin measured by gel permeation chromatography was 8,900; and the amine value was 32.5 mgKOH/g.

The comparative (meth)acrylic-based polymer (B'-1) (0.73 g in terms of nonvolatile matter) prepared above was dissolved in 10 mL of water and mixed with a solution prepared by dissolving 5.00 g (29.4 mmol) of silver nitrate in 20 mL of water. A solution composed of 3.94 g (44.2 mmol) of N,N-diethylhydroxylamine, the comparative (meth)acrylic-based polymer (B'-1) (0.73 g in terms of nonvolatile matter), and 100 g of water was dropped into the resultant solution over 3 hours. The resultant reaction mixture was filtered through ultrafiltration units (eight units, Vivaspin 20 from Sartorius Stedim Biotech, molecular weight cut-off: 100,000). A process of adding purified water to the filtration residue and subjecting the resultant solution to centrifugal filtration was repeated four times; and the resultant residue was mixed with water to provide 10 g of a dispersion liquid (nonvolatile content: 30 w/w %). The silver content of the nonvolatile matter was measured by thermogravimetric analysis and it was found to be 96.8%. The average particle size of the composite obtained was estimated to be 74 nm by dynamic light scattering and 40 to 80 nm from a TEM image (FIG. 9).

The dispersion liquid was applied to a glass plate with a spin coater so that a metal film having a small thickness of 0.30 micrometers was obtained. Immediately after the film was air-dried, it had a mere volume resistivity of $9.2 \times 10^0$ Ωcm; baking of the film at 100° C. for 30 minutes provided a film having a volume resistivity of $2.0 \times 10^{-5}$ Ωcm; baking of the film at 150° C. for 30 minutes provided a film having a volume resistivity of $7.7 \times 10^{-6}$ Ωcm.

FIG. 10 illustrates a SEM image of the metal film immediately after the film formation. FIG. 11.2 illustrates the particle-size distribution of silver nanoparticles in the film immediately after the film formation, the particle-size distribution being determined by small-angle X-ray scattering; FIGS. 11.3 and 11.4 respectively illustrate particle-size distributions after 6 hours and 12.5 hours elapsed. FIG. 11.1 illustrates the particle-size distribution of silver nanoparticles in the dispersion liquid, the particle-size distribution being determined by small-angle X-ray scattering. The large difference between the dispersion liquid and the metal film as described in EXAMPLE 1 was not observed. In addition, the extension of the particle-size distribution over time was also not observed. FIG. 12 illustrates measurements of silver nanoparticles obtained in COMPARATIVE EXAMPLE 1 over time in terms of crystallite size by wide-angle X-ray diffractometry. The increase in the crystallite size over time as described in EXAMPLE 1 was not observed.

Comparative Example 2

Synthesis of Comparative (Meth)Acrylic-Based Polymer (B'-2) not Including —SR or Phosphate Residue, and Production of Dispersion Liquid of Silver-Nanoparticle-Containing Composite from (Meth)Acrylic-Based Polymer (B'-2)

A mixture of 10 parts of dimethylaminoethyl methacrylate, 8 parts of 2-hydroxyethyl methacrylate, 80 parts of methoxypolyethylene glycol methacrylate (molecular weight: 1000), 80 parts of MEK, and 4 parts of a polymerization initiator "PERBUTYL O") was dropped over two hours into 70 parts of MEK that was maintained at 80° C. under nitrogen flow and was being stirred. After the dropping was finished, 2 parts of "PERBUTYL O" was added and the resultant solution was stirred at 95° C. for 22 hours. The resultant reaction mixture was mixed with water, depressurized to evaporate the solvent, and subsequently mixed with water so that the nonvolatile content was adjusted. In this manner, an aqueous solution of a comparative (meth)acrylic-based polymer (B'-2) not including —SR or phosphate residue was prepared (nonvolatile content: 33%). The weight-average molecular weight of the resin measured by gel permeation chromatography was 7,200; and the amine value was 27.6 mgKOH/g.

The comparative (meth)acrylic-based polymer (B'-2) (0.578 g in terms of solid matter) prepared above was dissolved in 12 mL of water, mixed with 12 mL of 1 mol/L nitric acid, subsequently mixed with a solution prepared by dissolving 2.00 g (11.77 mmol) of silver nitrate in 35 mL of water, and mixed with 8.78 g (58.85 mmol) of triethanolamine. The resultant solution was stirred at 60° C. for 2.5 hours. The reaction end point was checked and it was found that reduction was relatively insufficient. The resultant suspension was filtered through ultrafiltration units (four units, Vivaspin 20 from Sartorius Stedim Biotech, molecular weight cut-off: 100,000). A process of adding purified water to the filtration residue and subjecting the resultant solution to centrifugal filtration was repeated four times; and the resultant residue was mixed with water to provide 4.23 g of a dispersion liquid (solid content: about 30 w/w %). The silver content of the solid matter was found to be 96.0%. The particle size of the composite was found to be 30 nm from a TEM image.

The dispersion liquid was applied to a glass plate (application thickness: about 0.3 micrometers) with a spin coater and air-dried. At this time, the film did not have a resistivity measurable with a low resistivity meter; this state was not changed by baking of the film at 150° C. for 30 minutes; baking of the film at 180° C. for 30 minutes provided a film having a volume resistivity of $8.7 \times 10^{-4}$ Ωcm.

The invention claimed is:

1. A method for producing a metal-nanoparticle-containing composite, comprising:
   (I) a step of dissolving, in an aqueous medium, a (meth)acrylic-based polymer (B1) prepared through polymerization of a (meth)acrylate-based macromonomer (x1) having a polyethylene glycol chain (b1) in the presence of a chain transfer agent (x3) having a functional group (b3) represented by —SR (where R represents an alkyl group having 1 to 18 carbons; a phenyl group that may optionally have a substituent on a benzene ring; or an alkyl group having 1 to 8 carbons, the alkyl group having at least one functional group selected from the group consisting of a hydroxy group, an alkoxy group having 1 to 18 carbons, an aralkyloxy group having 1 to 18 carbons, a phenyloxy group that may optionally have a substituent on a benzene ring, a carboxy group, a salt of a carboxy group, a monovalent or polyvalent alkylcarbonyloxy group having 1 to 18 carbons, and a monovalent or polyvalent alkoxycarbonyl group having 1 to 18 carbons) and
   a (meth)acrylic-based polymer (B2) prepared through polymerization of a (meth)acrylate-based monomer (x2) having a phosphate residue (b2) represented by —OP(O)(OH)$_2$ in the presence of a chain transfer agent (x3) having a functional group (b3) represented by —SR (where R has the same definition as above);
   (II) a step of adding a metal compound (A) or an aqueous solution of the metal compound (A) to an aqueous solution prepared in (I); and
   (III) a step of dropping a reducing agent (C), an aqueous solution of the reducing agent (C), or an aqueous solution containing the (meth)acrylic-based polymer (B1) and/or the (meth)acrylic-based polymer (B2) and the reducing agent (C), into a mixed solution prepared in (II).

2. The method for producing a metal-nanoparticle-containing composite according to claim 1, wherein the (meth)acrylic-based polymers (B1) and (B2) have a weight-average molecular weight in a range of 3,000 to 10,000.

3. The method for producing a metal-nanoparticle-containing composite according to claim 1, wherein a metal species in the metal compound (A) is silver, gold, platinum, palladium, ruthenium, rhodium, or copper.

4. The method for producing a metal-nanoparticle-containing composite according to claim 1, wherein a mixing ratio of the (meth)acrylic-based polymer (B1) to the (meth)acrylic-based polymer (B2), that is, a molar ratio (B1)/(B2), is in a range of 20/1 to 1/1.

5. A method for producing a metal-nanoparticle-containing composite, comprising:
- (I') a step of dissolving, in an aqueous medium, a (meth)acrylic-based polymer (B3) prepared through polymerization of a (meth)acrylate-based macromonomer (x1) having a polyethylene glycol chain (b1) and a (meth)acrylate-based monomer (x2) having a phosphate residue (b2) represented by —OP(O)(OH)$_2$ in the presence of a chain transfer agent (x3) having a functional group (b3) represented by —SR (where R represents an alkyl group having 1 to 18 carbons; a phenyl group that may optionally have a substituent on a benzene ring; or an alkyl group having 1 to 8 carbons, the alkyl group having at least one functional group selected from the group consisting of a hydroxy group, an alkoxy group having 1 to 18 carbons, an aralkyloxy group having 1 to 18 carbons, a phenyloxy group that may optionally have a substituent on a benzene ring, a carboxy group, a salt of a carboxy group, a monovalent or polyvalent alkylcarbonyloxy group having 1 to 18 carbons, and a monovalent or polyvalent alkoxycarbonyl group having 1 to 18 carbons);
- (II') a step of adding a metal compound (A) or an aqueous solution of the metal compound (A) to an aqueous solution prepared in (I'); and
- (III') a step of dropping, into a mixed solution prepared in (II'), a reducing agent (C), an aqueous solution of the reducing agent (C), or
  an aqueous solution containing the reducing agent (C) and at least one (meth)acrylic-based polymer selected from the group consisting of
  a (meth)acrylic-based polymer (B1) prepared through polymerization of a (meth)acrylate-based macromonomer (x1) having a polyethylene glycol chain (b1) in the presence of a chain transfer agent (x3) having a functional group (b3) represented by —SR (where R has the same definition as above),
  a (meth)acrylic-based polymer (B2) prepared through polymerization of a (meth)acrylate-based monomer (x2) having a phosphate residue (b2) represented by —OP(O)(OH)$_2$ in the presence of a chain transfer agent (x3) having a functional group (b3) represented by —SR (where R has the same definition as above), and
  the (meth)acrylic-based polymer (B3).

6. The method for producing a metal-nanoparticle-containing composite according to claim 5, wherein the (meth)acrylic-based polymer (B3) has a weight-average molecular weight in a range of 3,000 to 10,000.

7. The method for producing a metal-nanoparticle-containing composite according to claim 5, wherein the (meth)acrylic-based polymer (B3) is prepared by using the (meth)acrylate-based macromonomer (x1) having the polyethylene glycol chain (b1) and the (meth)acrylate-based monomer (x2) having the phosphate residue (b2) with a molar ratio (x1)/(x2) being in a range of 1/2 to 10/1, and by using the chain transfer agent (x3) having the functional group (b3) represented by —SR (where R has the same definition as above) in a molar amount that is 0.05 to 0.5 times a total number of moles of the (meth)acrylate-based macromonomer (x1) and the (meth)acrylate-based monomer (x2).

8. The method for producing a metal-nanoparticle-containing composite according to claim 5, wherein a metal species in the metal compound (A) is silver, gold, platinum, palladium, ruthenium, rhodium, or copper.

9. A metal-nanoparticle-containing composite comprising metal nanoparticles (A') that have a particle size of 2 to 50 nm and are covered with a (meth)acrylic-based polymer (B),
wherein the (meth)acrylic-based polymer (B) includes a (meth)acrylic-based polymer (B1) that has, at at least one end, a functional group (b3) represented by —SR (where R represents an alkyl group having 1 to 18 carbons; a phenyl group that may optionally have a substituent on a benzene ring; or an alkyl group having 1 to 8 carbons, the alkyl group having at least one functional group selected from the group consisting of a hydroxy group, an alkoxy group having 1 to 18 carbons, an aralkyloxy group having 1 to 18 carbons, a phenyloxy group that may optionally have a substituent on a benzene ring, a carboxy group, a salt of a carboxy group, a monovalent or polyvalent alkylcarbonyloxy group having 1 to 18 carbons, and a monovalent or polyvalent alkoxycarbonyl group having 1 to 18 carbons), and has a polyethylene glycol chain (b1) as a side chain, and
a (meth)acrylic-based polymer (B2) that has, at at least one end, a functional group (b3) represented by —SR (where R has the same definition as above) and has, as a side chain, a phosphate residue (b2) represented by —OP(O)(OH)$_2$.

10. The metal-nanoparticle-containing composite according to claim 9, wherein the (meth)acrylic-based polymer (B) further includes a (meth)acrylic-based copolymer that has, at at least one end, a functional group (b3) represented by —SR (where R has the same definition as above) and has, as side chains, a polyethylene glycol chain (b1) and a phosphate residue (b2) represented by —OP(O)(OH)$_2$.

11. A dispersion liquid of a metal-nanoparticle-containing composite, comprising the metal-nanoparticle-containing composite according to claim 10, being dispersed in at least one solvent selected from the group consisting of water, an organic solvent having a hydroxy group, and an aromatic hydrocarbon solvent.

12. The dispersion liquid according to claim 11, wherein a content of the metal-nanoparticle-containing composite is 10 to 85 mass %.

13. The metal-nanoparticle-containing composite according to claim 10, wherein a content of the metal nanoparticles (A') in the composite is 92 to 98 mass %.

14. The metal-nanoparticle-containing composite according to claim 9, wherein a content of the metal nanoparticles (A') in the composite is 92 to 98 mass %.

15. A dispersion liquid of a metal-nanoparticle-containing composite, comprising the metal-nanoparticle-containing composite according to claim 9 being dispersed in at least one solvent selected from the group consisting of water, an organic solvent having a hydroxy group, and an aromatic hydrocarbon solvent.

16. The dispersion liquid according to claim 15, wherein a content of the metal-nanoparticle-containing composite is 10 to 85 mass %.

* * * * *